(12) United States Patent
Muller et al.

(10) Patent No.: US 10,040,153 B2
(45) Date of Patent: Aug. 7, 2018

(54) RETROFIT FOR CURRENT CNC MACHINES TO ALLOW FOR 'SHAPING' STYLE MACHINING PROCESS

(71) Applicant: Apple Inc., Cupertino, CA (US)

(72) Inventors: Peter R. Muller, San Luis Obispo, CA (US); Matthew S. Theobald, San Francisco, CA (US); Vincent Tiaga, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1193 days.

(21) Appl. No.: 14/078,085

(22) Filed: Nov. 12, 2013

(65) Prior Publication Data

US 2015/0125227 A1   May 7, 2015

(51) Int. Cl.
| | | |
|---|---|---|
| *B23D 11/00* | (2006.01) | |
| *B23Q 3/155* | (2006.01) | |
| *B23B 31/02* | (2006.01) | |

(52) U.S. Cl.
CPC .......... *B23Q 3/15566* (2013.01); *B23B 31/02* (2013.01); *B23D 11/00* (2013.01); *B23B 2270/60* (2013.01); *Y10T 29/49716* (2015.01); *Y10T 408/31* (2015.01); *Y10T 409/30448* (2015.01); *Y10T 409/309296* (2015.01); *Y10T 483/10* (2015.01); *Y10T 483/1795* (2015.01)

(58) Field of Classification Search
CPC ................ B23D 11/00; B23B 2270/60; Y10T 409/30448; Y10T 409/309296; Y10T 483/10; Y10T 483/1793; Y10T 483/1795; Y10T 29/49716; B23Q 3/1556; B23Q 3/15566

USPC ......... 409/144, 230; 483/1, 55, 56; 29/401.1
See application file for complete search history.

(56) References Cited

U.S. PATENT DOCUMENTS 5,090,851 A    2/1992  White
5,351,376 A *  10/1994 Kitamura ............. B23Q 1/0018
                                                  279/20

(Continued)

FOREIGN PATENT DOCUMENTS

CN    2118612         10/1992
CN    1161012 A       10/1997

(Continued)

OTHER PUBLICATIONS

Chinese Patent for Utility Model No. ZL201420783911.1—Evaluation Report for Utility Model Patent dated Aug. 25, 2015.

(Continued)

*Primary Examiner* — Sunil K Singh
*Assistant Examiner* — Michael Vitale
(74) *Attorney, Agent, or Firm* — Dickinson Wright RLLP

(57) ABSTRACT

An apparatus configured to convert a rotary machine to a non-rotary machine is provided. The apparatus may include a tool body that engages a rotary head of a CNC mill and a rotation restraint member that is fixed at a stationary position relative to a rotational axis of the rotary head. An arm of the tool body may engage the rotation restraint member to prevent rotation of the tool body. A cutting tool may be coupled to the tool body such that rotation thereof is also fixed. The arm of the tool body may include an elongated aperture that allows for slight pivoting of the tool body and the cutting tool to facilitate chip removal and cutting in opposing directions. Related methods are also provided.

20 Claims, 19 Drawing Sheets

(56) References Cited

U.S. PATENT DOCUMENTS

| | | |
|---|---|---|
| 5,947,650 A | 9/1999 | Satran et al. |
| 5,971,672 A | 10/1999 | Hansson et al. |
| 8,951,705 B2 | 2/2015 | Nakayama et al. |
| 2011/0182686 A1* | 7/2011 | Usuda .................... B23Q 3/12 409/144 |
| 2014/0271014 A1 | 9/2014 | Satou |

FOREIGN PATENT DOCUMENTS

| | | | | |
|---|---|---|---|---|
| CN | 1196695 A | 10/1998 | | |
| CN | 200954563 | 10/2007 | | |
| CN | 201419338 | 3/2010 | | |
| CN | 201644826 | 11/2010 | | |
| CN | 202861496 | 4/2013 | | |
| CN | 204487241 U | 7/2015 | | |
| EP | 0231085 A2 | 8/1987 | | |
| EP | 2505285 A1 * | 10/2012 | ............ | B23B 29/04 |
| JP | 2005329493 A * | 12/2005 | | |
| JP | 4476601 B2 | 6/2010 | | |
| JP | 3183660 U * | 5/2013 | ............ | B23B 29/12 |
| JP | 2013218287 A | 10/2013 | | |

OTHER PUBLICATIONS

Chinese Patent Application No. 201410763765.0—Office Action dated Dec. 1, 2016.

\* cited by examiner

RETROFIT FOR CURRENT CNC MACHINES TO ALLOW FOR 'SHAPING' STYLE MACHINING PROCESS

CROSS-REFERENCE TO RELATED APPLICATION

This application claims the benefit of priority from U.S. Provisional Patent Application No. 61/899,816, filed on Nov. 4, 2013, which is hereby incorporated herein by reference in its entity.

FIELD

The present disclosure relates generally to cutting tools, and more particularly to an apparatus configured to convert a rotary machine to a non-rotary machine and a related non-rotary tool.

BACKGROUND

Components employed to form various devices such as computing devices often undergo numerous manufacturing operations during the production thereof. Additive manufacturing processes add material to form a component. By way of example, injection molding may be employed to form a component. Conversely, subtractive manufacturing processes remove material from a workpiece or substrate to form a component. For example, material may be machined from a substrate to form the component. In some embodiments additive and subtractive processes may both be employed to form a component, depending on the particular desired final configuration of the component.

Computer numerical control (CNC) machining is one example of a type of subtractive manufacturing process commonly employed to form components. CNC machining typically employs a robotic assembly and a controller. The robotic assembly typically may include a rotating spindle to which a milling cutter is coupled. The milling cutter includes cutting edges that remove material from a substrate to form a component defining a desired shape and dimensions. In this regard, the controller directs the robotic assembly to move the milling cutter along a machining path that forms the component.

However, CNC machining may not be configured to or capable of forming certain desired shapes of components. Accordingly, improved methods for machining may be desirable.

SUMMARY

Embodiments of the present disclosure relate to an apparatus configured to convert a rotary machine to a non-rotary machine. Thus, for example, a CNC mill may be employed to scrape or otherwise remove material from a substrate without employing a rotary tool. The apparatus may include a tool body that engages a rotary head of the CNC mill. The apparatus may additionally include a rotation restraint member. The rotation restraint member may engage a stationary member, such as a body of the CNC mill, and thereby the rotation restraint member may be positioned at a fixed distance from the rotary head. The tool body may include an arm that engages the rotation restraint member and thereby a cutting tool coupled to the tool body may be prevented from rotating.

More particularly a protrusion defined by the rotation restraint member may engage an aperture in the arm of the tool body, or vice versa. The aperture may be elongated in one embodiment such that the protrusion may move slightly within the aperture. Thereby, the cutting tool may pivot slightly. This pivoting movement may allow a rear cutting edge of the cutting tool to retract from a substrate being cut with a front cutting edge to allow a clearance for removal of chips and other removed material.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Figure 1:
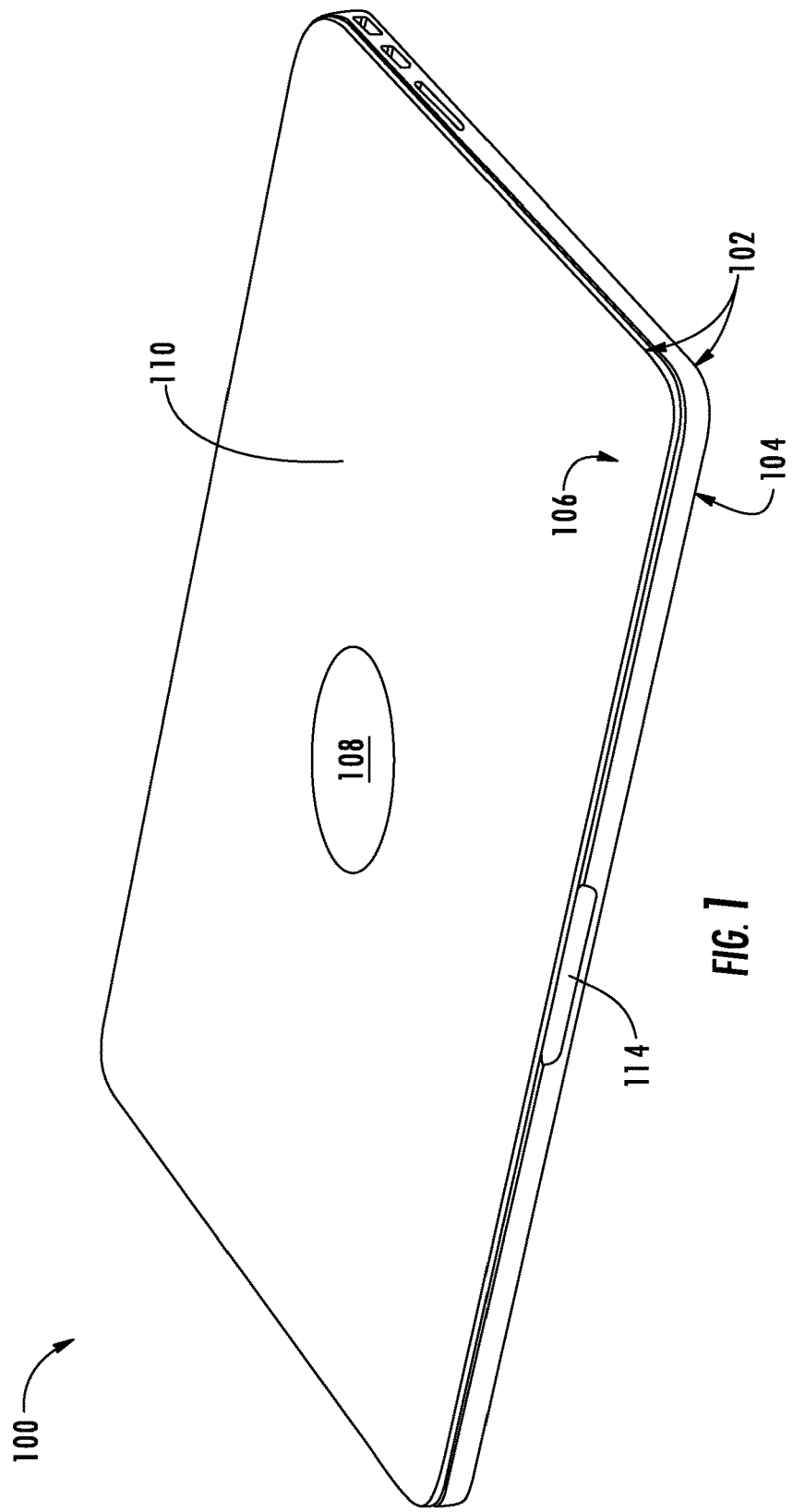
FIG. 1 illustrates a front facing perspective view of an embodiment of the portable computing device in a closed configuration according to an example embodiment of the present disclosure.

Representative applications of systems, apparatuses, computer program products and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described in detail below, the following relates to manufacturing tools, assemblies, apparatuses, systems, devices, computer program products, and methods. Embodiments of the disclosure may be employed to form a variety of components including, for example, electronic devices. By way of more specific example, the manufacturing methods disclosed herein may be employed in manufacturing a computing device such as a desktop computer, a laptop computer, a net book computer, a tablet computer, a cellphone, a smartphone, etc., or any accessory therefor such as a keyboard and a monitor. Thus, purely for purposes of example, embodiments of a portable computing device that may be formed by these manufacturing methods are described and illustrated herein. However it should be understood that various other embodiments of devices may be formed using the tools, assemblies, apparatuses, systems, devices, computer program products, and methods of the present disclosure.

In one embodiment a portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The top case and the bottom case can each be joined in a particular manner at an interface region such that the gap and offset between top and bottom cases are not only reduced, but are also more consistent from device to device during the mass production of devices.

In a particular embodiment, the lid and base portion can be pivotally connected with each other by way of what can be referred to as a clutch assembly. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The top case can include a cavity, or lumen, into which a plurality of operational components can be inserted during an assembly operation. In the described embodiment, the operational components can be inserted into the lumen and attached to the top case in a "top-bottom" assembly operation in which top most components are inserted first followed by components in a top down arrangement. For example, the top case can be provided and shaped to accommodate a keyboard module. The keyboard module can include a keyboard assembly formed of a plurality of keycap assemblies and associated circuitry, such as a flexible membrane on which can be incorporated a switching matrix and protective feature plate. Therefore, following the top-bottom assembly approach, the keyboard assembly is first inserted into the top case followed by the flexible membrane and then the feature plate that is attached to the top case. Other internal components can then be inserted in a top to bottom manner (when viewed from the perspective of the finished product).

In one embodiment, the keyboard module can be configured in such a way that a keycap assembly can be used to replace a power switch. For example, in a conventional keyboard each of a top row of keycaps can be assigned at least one function. However, by re-deploying one of the keycaps as a power button, the number of operational components can be reduced by at least eliminating the switch mechanism associated with the conventional power button and replacing it with the already available keycap assembly and associated circuitry.

In addition to the keyboard, the portable computing device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs. The touchpad can include circuitry for processing signals from a sensor associated with the touchpad. In one embodiment, the circuitry can be embodied as a printed circuit board (PCB). The PCB can be formed of material and placed in such a way that it provides structural support for the touchpad. Thus, a separate touchpad support is eliminated.

In one embodiment, the top case can be formed from a single billet of aluminum that is machined into a desired shape and size. The top case can include an integrated support system that adds to the structural integrity of the top case. The integrated support system can be continuous in nature in that there are no gaps or breaks. The integrated support system can be used to provide support for individual components (such as a keyboard). For example, the integrated support system can take the form of ribs that can be used as a reference datum for a keyboard. The ribs can also provide additional structural support due to the added thickness of the ribs. The ribs can also be used as part of a shield that helps to prevent light leaking from the keyboard as well as act as a Faraday cage that prevents leakage of extraneous electromagnetic radiation.

The continuous nature of the integrated support system can result in a more even distribution of an external load applied to the multi-part housing resulting in a reduced likelihood of warping, or bowing that reduces risk to internal components. The integrated support system can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touch pad.

These and other embodiments are discussed below with reference to FIGS. 1-4. However, those skilled in the art will readily appreciate that the detailed description given herein with respect to these figures is for explanatory purposes only.

FIG. 1 illustrates a portable computing device 100 in the form of a laptop computer in accordance with an example embodiment of the present disclosure. More particularly, FIG. 1 shows a front facing perspective view of the portable computing device 100 in a closed configuration. As illustrated, the portable computing device 100 may include a housing 102 comprising a base portion 104 and a lid portion 106. In the closed configuration, the lid portion 106 and the base portion 104 form what appears to be a uniform structure having a continuously varying and coherent shape that enhances both the look and feel of the portable computing device 100. In some embodiments portable computing device 100 may include a logo 108 at a rear case 110 of the lid portion 106 of the housing 102. In one embodiment, the logo 108 can be illuminated by light emitted from a display 112 (see, e.g., FIG. 2).

The base portion 104 can be pivotally connected to the lid portion 106 by way of a hinge that may include a clutch assembly in some embodiments. The base portion 104 may include an inset portion 114 suitable for assisting a user in lifting the lid portion 106 by, for example, a finger. Accordingly, the lid portion 106 of the housing 102 can be moved with respect to the base portion 104 of the housing with the aid of the clutch assembly from a closed position (see, e.g., FIG. 1) to an open position (see, e.g., FIG. 2).

Figure 2:
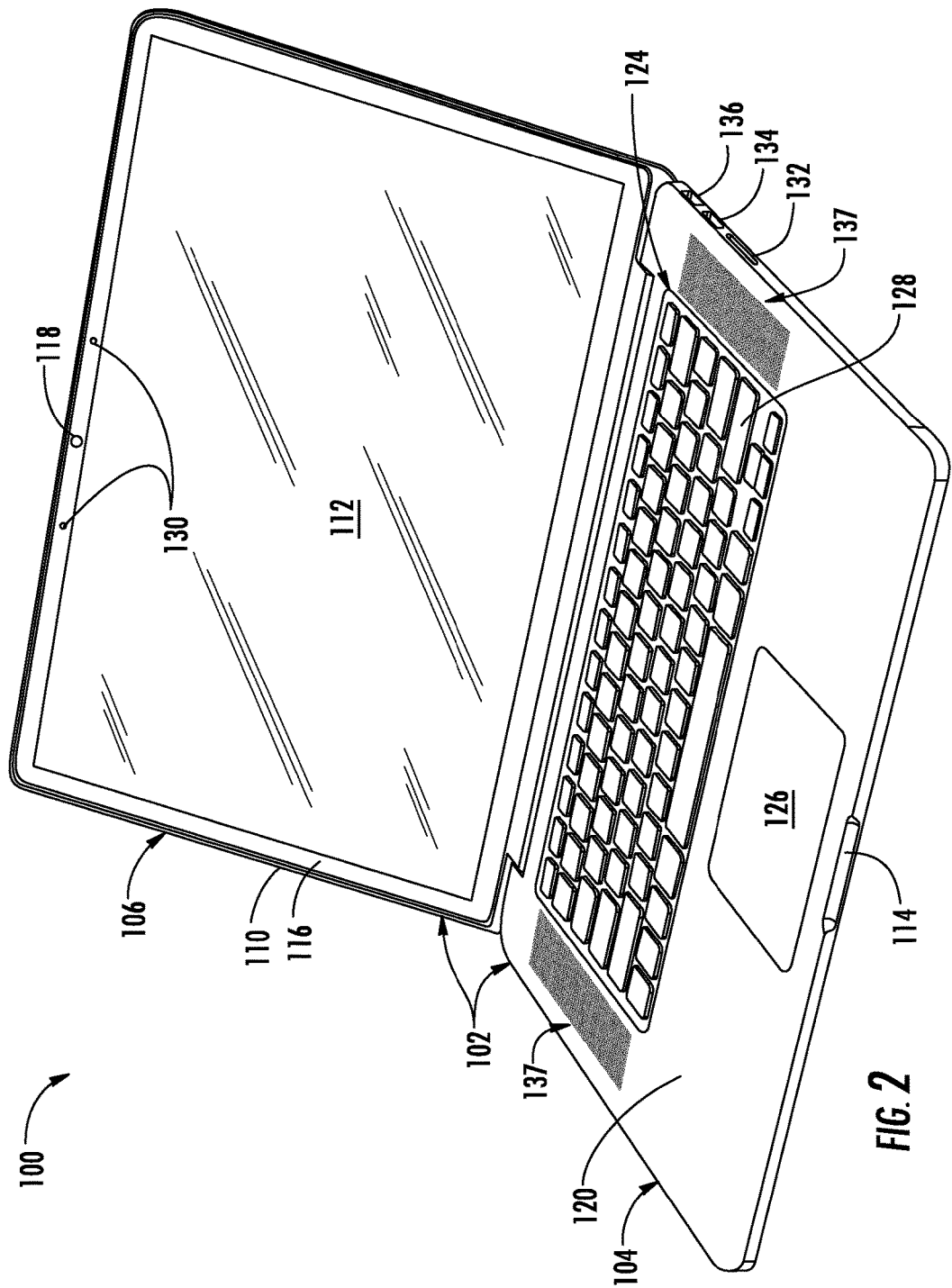
FIG. 2 illustrates the portable computing device of FIG. 1 in an open configuration according to an example embodiment of the present disclosure.

FIG. 2 shows a front facing perspective view of the portable computing device 100 in the open configuration. The display 112 may be coupled to the rear case 110 of the lid portion 106 such that the display is provided with structural support. In this regard, the lid portion 106 can be formed to have uni-body construction provided by the rear case 110 that can provide additional strength and resiliency to the lid portion which is particularly important due to the stresses caused by repeated opening and closing. In addition to the increase in strength and resiliency, the uni-body construction of the lid portion 106 can reduce overall part count by eliminating separate support features, which may decrease manufacturing cost and/or complexity.

The lid portion 106 may include a mask (also referred to as display trim) 116 that surrounds the display 112. The display trim 116 can be formed of an opaque material such as ink deposited on top of or within a protective layer of the display 112. Thus, the display trim 116 can enhance the overall appearance of display 112 by hiding operational and structural components as well as focusing attention onto the active area of the display.

The display 112 can display visual content such as a graphical user interface, still images such as photos as well as video media items such as movies. The display 112 can display images using any appropriate technology such as a liquid crystal display (LCD), a light emitting diode (LED) display, an organic light emitting diode (OLED) display, etc. Further, the portable computing device 100 may include an image capture device 118. In one embodiment the image capturing device 118 may be located on a transparent portion of the display trim 116. The image capture device 118 can be configured to capture both still and video images in some embodiments.

Figure 3:
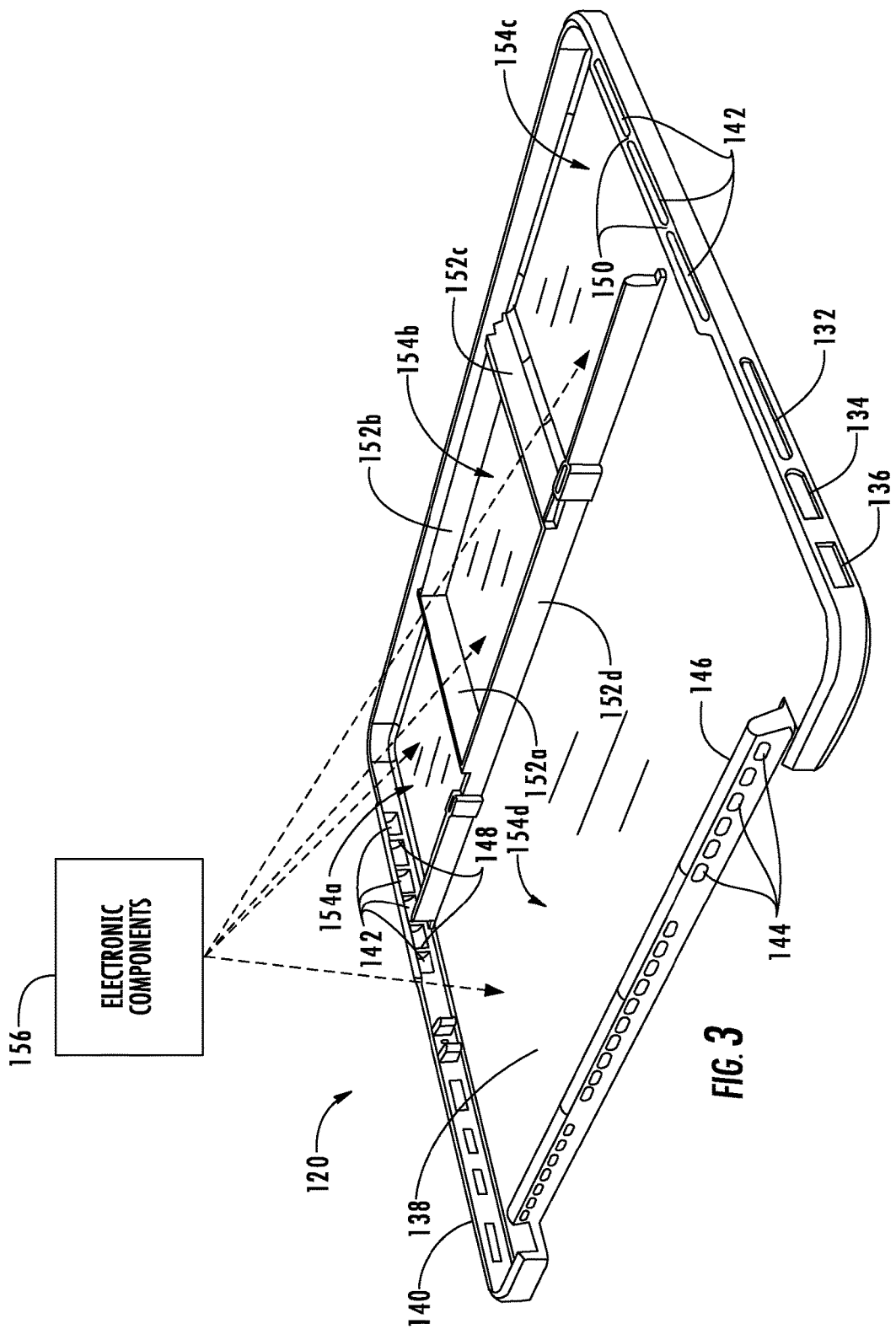
FIG. 3 illustrates a bottom perspective view of a top case of a base portion of the portable computing device of FIG. 1 according to an example embodiment of the present disclosure.
Figure 4:
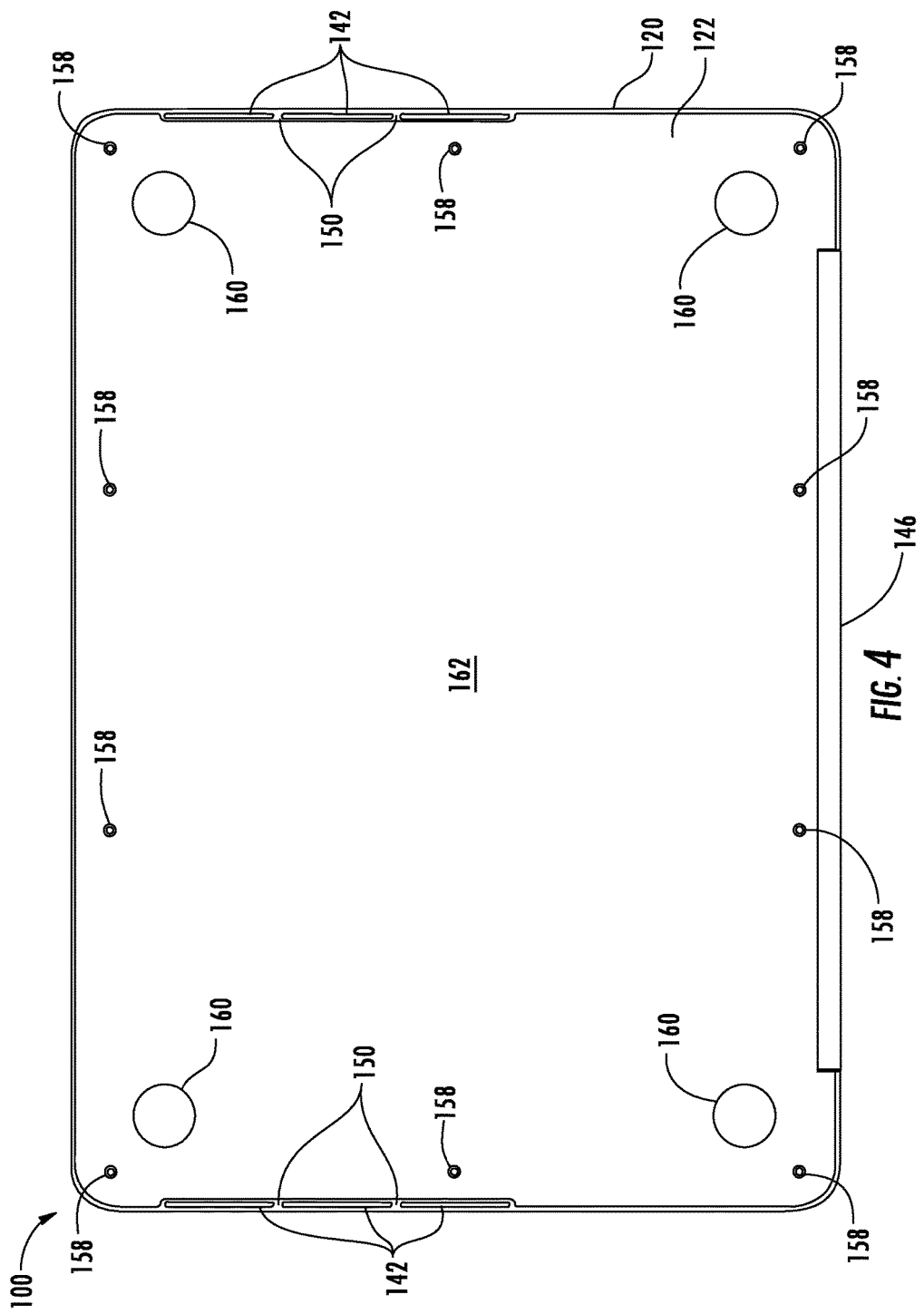
FIG. 4 illustrates a bottom view of the portable computing device of FIG. 1 according to an example embodiment of the present disclosure.

The base portion 104 may comprise a top case 120 (see, e.g., FIG. 3) fastened to a bottom case 122 (see, e.g., FIG. 4). As illustrated in FIG. 2, the top case 120 can be configured to accommodate various user input devices such as a keyboard 124 and a touchpad 126. The keyboard 124 can include a plurality of low profile keycap assemblies 128. In one embodiment, an audio transducer (not shown) can use selected portions of keyboard 124 to control output audio signals such as music. One or more microphones 130 can be located on the lid portion 106. The microphones 130 may be spaced apart to improve frequency response of an associated audio circuit.

Each of the plurality of keycap assemblies 128 can have a symbol imprinted thereon for identifying the key input associated with the particular key pad. The keyboard 124 can be arranged to receive a discrete input at each keycap assembly 128 using a finger motion referred to as a keystroke. In the described embodiment, the symbols on each keycap assembly 128 can be laser etched thereby creating an extremely clean and durable imprint that will not fade under the constant application of keystrokes over the life of portable computing device 100. In order to reduce component count, one of the keycap assemblies 128 can be re-provisioned as a power button. In this way, the overall number of components in the portable computing device 100 can be commensurably reduced.

The touchpad 126 can be configured to receive finger gesturing. A finger gesture can include touch events from more than one finger applied in unison. The gesture can also include a single finger touch event such as a swipe or a tap. The gesture can be sensed by a sensing circuit in the touchpad 126 and converted to electrical signals that are passed to a processing unit for evaluation. In this way, portable computing device 100 can be at least partially controlled by touch.

One or more data ports 132, 134, 136 can be used to transfer data and/or power between an external circuit(s) and the portable computing device 100. The data ports can include, for example, an input slot 132 that can be used to accept a memory card (such as a FLASH memory card), whereas the remaining data ports 134, 136 can be used to accommodate data connections such as USB, FireWire, Thunderbolt, and so on. Further, in some embodiments, one or more speaker grids 137 can be used to output audio from an associated audio component enclosed within base portion 104 of the housing 102.

FIG. 3 illustrates a perspective bottom view of the top case 120 of the base portion 104 of the housing 102. As illustrated, the top case 120 may comprise a major wall 138 and an outer rim 140 extending therefrom. A plurality of vents 142 may be defined in the top case 120. For example, the vents 142 are defined in the outer rim 140 in the illustrated embodiment. The vents 142 may be configured to provide a flow of outside air that can be used to cool internal components by allowing air to enter or exit therethrough. For example, the vents 142 in the outer rim 140 may comprise intake vents and a plurality of vents 144 defined in a rear wall 146 may comprise exhaust vents. In another embodiment the vents 142 in the outer rim 140 can act as a secondary air intake subordinate to primary air intake vents or the vents in the outer rim may comprise exhaust vents.

The vents 142 in the outer rim 140 can also be used to output audio signals in the form of sound generated by an audio module. Accordingly, the vents 142 can be used to output sound at a selected frequency range in order to improve quality of an audio presentation by the portable computing device 100. Additionally, the vents 142 in the outer rim 140 can be part of an integrated support system for the top case 120. In this regard, internal ribs 148 may be positioned within the vents 142 and/or external ribs 150 may be positioned between the vents to provide additional structural support to the portable computing device 100. In some embodiments the vents 142 may be machined from the material defining the top case 120 with the ribs 148, 150 comprising retained material.

The cadence and size of the vents 142 can be used to control air flow into portable computing device 100 as well as control emission of radio frequency (RF) energy in the form of electromagnetic interference (EMI) from the portable computing device. In this regard, the internal ribs 148 can separate an area within the vents 142 to produce an aperture sized to reduce passage of RF energy. The size of an aperture defined by each of the vents 142 may dictate the wavelength of RF energy that can be "trapped" by the aperture. In this case, the size of vents 142 is such that a substantial portion of RF energy emitted by internal components can be trapped within the portable computing device 100. Furthermore, by placing vents 142 at a downward facing outer surface of the top case 120, the aesthetics of portable computing device 100 can be enhanced since views of internal components from an external observer are eliminated during normal use.

As illustrated, the rear wall 146 may extend from the major wall 138. The rear wall 146 may be configured to hide the clutch at the hinge between the base portion 104 and the lid portion 106 of the housing 102. A plurality of inner sidewalls 152a-d may also extend from the major wall 138. The inner sidewalls 152a-d may divide an interior space defined by the base portion 104 into a plurality of compartments 154a-d.

As schematically illustrated in FIG. 3, the portable computing device 100 may include a plurality of electronic components 156, which may be received in one or more of the compartments 154a-d. As may be understood, by way of example, the electronic components 156 may include a mass storage device (e.g., a hard drive or a solid state storage device such as a flash memory device including non-transitory and tangible memory that may be, for example, volatile and/or non-volatile memory) configured to store information, data, files, applications, instructions or the like, a processor (e.g., a microprocessor or controller) configured to control the overall operation of the portable electronic device, a communication interface configured for transmitting and receiving data through, for example, a wired or wireless network such as a local area network (LAN), a metropolitan area network (MAN), and/or a wide area network (WAN), for example, the Internet, a fan, a heat pipe, and one or more batteries. However, various other electronic components may additionally or alternatively be received in the housing 102 of the portable electronic device as may be understood by one having skill in the art.

FIG. 4 shows an external view of the bottom of the bottom case 122 of the base portion 104 of the housing 102. One or more fasteners 158 may be positioned at the bottom case 122 of the base portion 104 of the housing 102. The fasteners 158 may be configured to secure the bottom case 122 to the top case 120 to enclose the above-described electronic components 156.

Additionally, in some embodiments the portable computing device 100 may include one or more bumpers. Bumpers may serve a variety of purposes. In this regard, in the illustrated embodiment the portable computing device 100 includes bumpers in the form of feet 160 coupled to an outer surface 162 of the bottom case 122 of the base portion 104 of the housing 102.

Devices such as the above-described portable computing device 100 may be produced by machining a substrate to define one or more components thereof. For example, computer numerical control (CNC) machining may be employed to form components of the portable computing device 100. By way of more particular example, a CNC mill may be employed to form components of the portable computing device 100.

Figure 5:
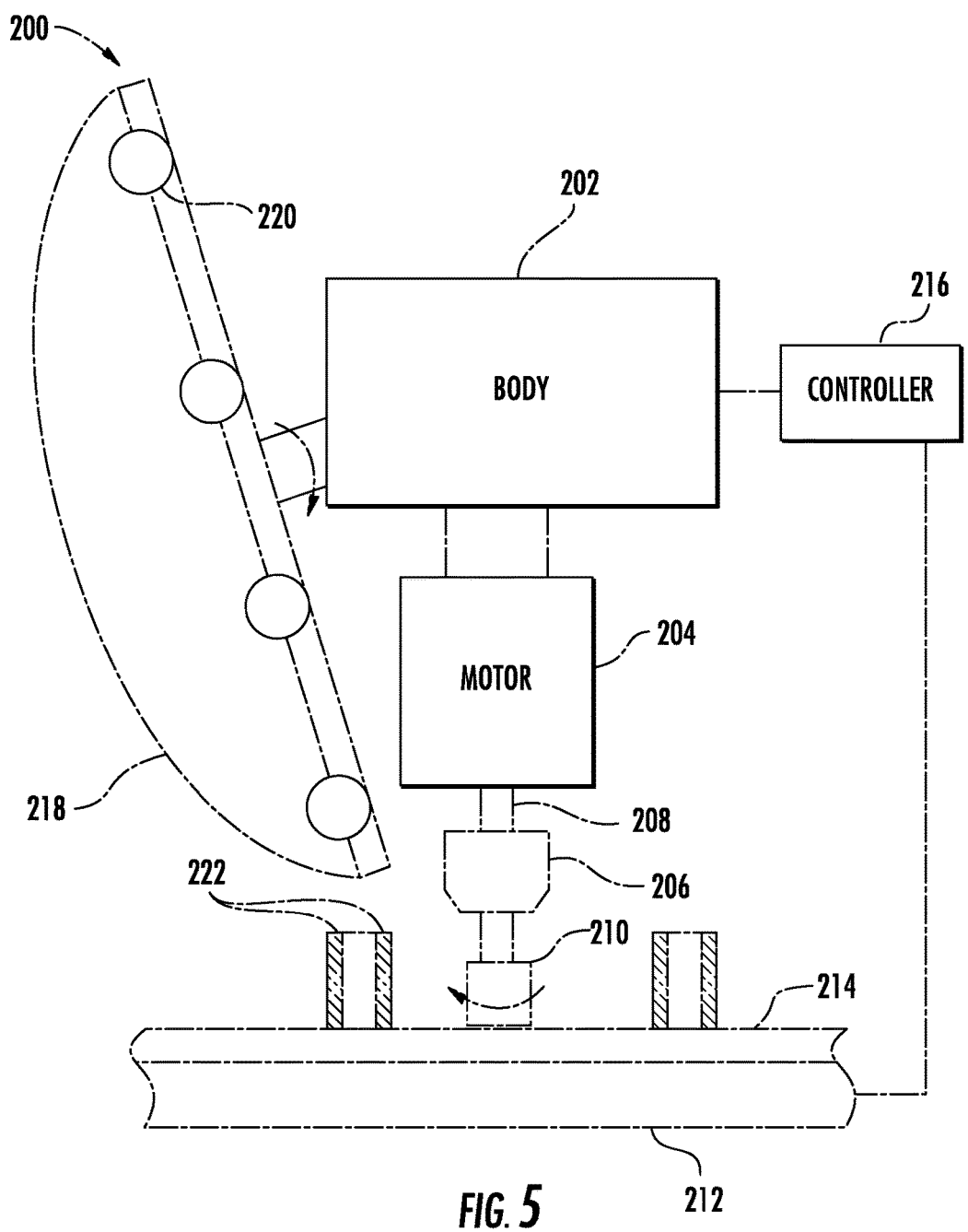
FIG. 5 schematically illustrates a computer numerical control (CNC) mill including a rotary cutter according to an embodiment of the present disclosure.

In this regard, FIG. 5 illustrates an example embodiment of a CNC mill 200 according to an example embodiment of the present disclosure. In one embodiment the CNC mill 200 may comprise a 3-axis vertical mill available from FANUC Corporation of Oshino-mura, Japan. However, various other embodiments of CNC mills may be employed in accordance with embodiments of the present disclosure.

As illustrated, the CNC mill 200 may include a machine body 202, which may be stationary or configured to move in one or more directions (e.g., due to coupling to moveable arms). The CNC may further comprise a motor 204 configured to rotate a rotary head 206 coupled thereto via a spindle 208. The rotary head 206 may couple to a rotary tool 210 such as any of various milling cutters. A machining table 212 may be configured to support a workpiece or substrate 214. The machining table 212 may be stationary or configured to move in one or more directions. Further, the CNC mill 200 may include a controller 216.

Accordingly, the controller 216 may direct the motor 204 to rotate, which may in turn rotate the spindle 208, the rotary head 206, and the rotary tool 210 coupled thereto. Further, the controller 216 may direct movement of the rotary tool 210 relative to the substrate 214. For example, the machining table 212 may move the substrate 214 or the CNC mill 200 may move the body 202 and/or other portion of the CNC mill to move the rotary tool 210. In the illustrated embodiment the CNC mill 200 further comprises a carousel 218 including various slots 220 configured to hold additional rotary tools. Thereby, the carousel 218 may rotate to swap the rotary tool 210 with another rotary tool to perform various differing operations on the substrate 214 and/or replace worn rotary tools.

Figure 6:
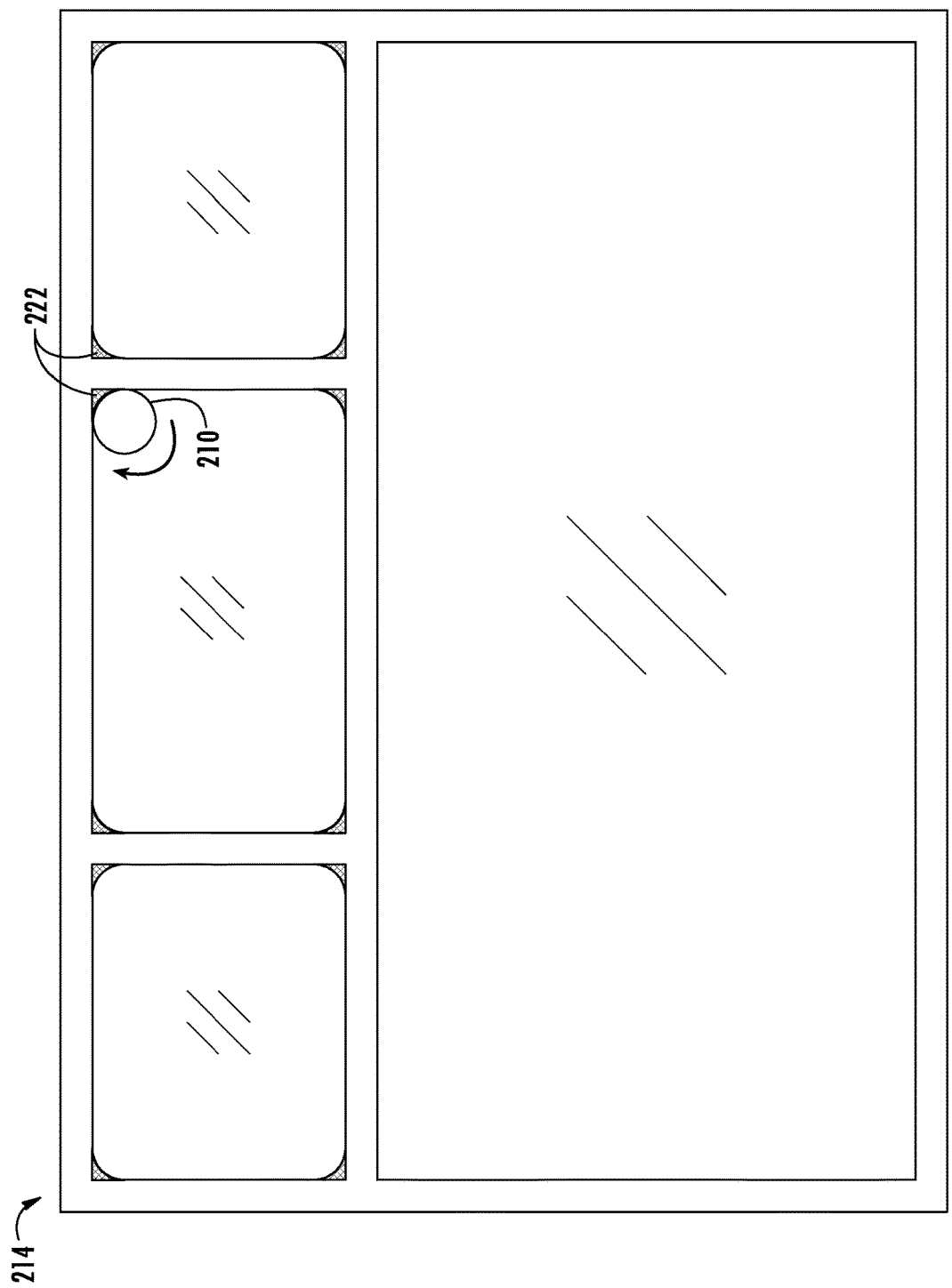
FIG. 6 illustrates the rotary cutter cutting a substrate according to an example embodiment of the present disclosure.

Accordingly, the CNC mill 200 may remove material from the substrate 214 to form a component. For example, the substrate 214 may be machined to form the above-described top case 120 of the base portion 104 of the housing 102. However, depending on the characteristics of the rotary tool 210 and the desired shape of the component, the rotary tool may be incapable of removing material from the substrate 214 to the desired extent. In this regard, as illustrated in FIGS. 5 and 6, after machining the substrate 214 with the rotary tool 210 of the CNC mill 200, certain remaining material sections 222 may exist. As illustrated in FIG. 6, the remaining material sections 222 may result from the rotary tool 210 defining a round cross-section perpendicular to a rotational axis thereof. Accordingly, the rotary tool 210 may be incapable of forming square corners in the substrate 214. Instead, the remaining material sections 222, defining a rounded configuration, may be present at the desired corners.

In the production of some embodiments of components, formation of rounded corners may not be of concern. However, in other embodiments of components, rounded corners may detrimentally affect the product produced therefrom. For example, in the portable computing device 100 described above, rounded corners between the inner sidewalls 152a-d may result in a reduction in volume of the compartments 154a-d (see, e.g., FIG. 3). Thereby, the size of the electronic components 156 received in the compartments 154a-d may have to be reduced. Thus, the size of a battery or a hard drive received in one of the compartments 154a-d may have to be reduced, with a respective reduction in memory or battery capacity. Accordingly, it may be important to produce square corners or otherwise remove material to meet component specifications (e.g., in the context of a blind pocket). Further, it may be desirable to produce components defining configurations that may be difficult to produce using a rotary tool (e.g., a pocket defined in a substrate bound on either side by two integral walls).

Certain existing technologies may allow for removal of material from locations that may be difficult or impossible to remove using a rotary tool. For example, Electro Chemical Machining (ECM) is a process wherein material is removed by controlled dissolution. More particularly, metal particles are removed by the application of electrical power and a saline solution, which washes away the removed particles. Further, material removal may also be accomplished via Electric Discharge Machining (EDM), which is also known as spark erosion. EDM functions by inducing a spark between an electrode and the substrate that results in a very small crater on the surface thereof. By producing repetitive sparks, more material is removed, and the waste material may then be washed away. Like ECM the material closest to the electrode is affected first.

However, ECM, EDM, and other similar methods of removing material are relatively slow. Further, ECM and EDM typically require removal of the substrate from the CNC mill to perform these operations, resulting in additional manufacturing complexities and manufacturing time. Accordingly, improved material removal processes may be desirable.

Figure 7:
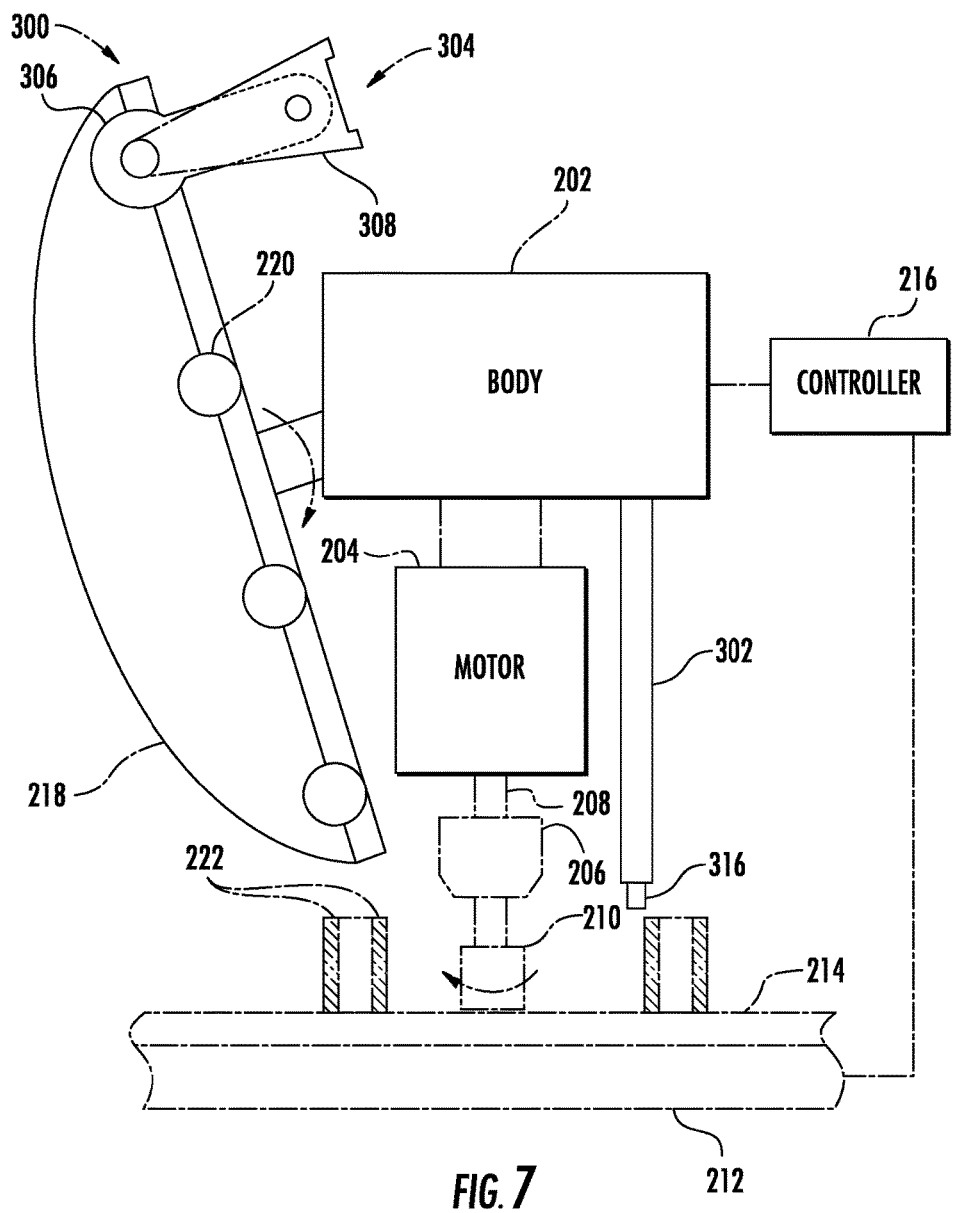
FIG. 7 schematically illustrates a material removal system comprising a non-rotary tool including a tool body and a cutting tool according to an example embodiment of the present disclosure.

In this regard, FIG. 7 illustrates an example embodiment of a material removal system 300 according to an example embodiment of the present disclosure. As illustrated, in one embodiment the material removal system 300 may include some or all of the components of the CNC mill 200 described above. In this regard, one embodiment of the present disclosure is configured to retrofit existing CNC mills to include additional or alternative functionality.

One embodiment of the present disclosure is configured to convert a rotary machine (e.g., a CNC mill) to operate as a non-rotary machine, as described hereinafter. In this regard, the system 300 may further comprise a rotation restraint member 302 and a non-rotary tool 304 configured to remove material from a substrate (e.g., substrate 214). As illustrated, the non-rotary tool 304 may initially be received in one of the slots 220 in the carousel 218. In this regard, the non-rotary tool 304 may comprise a cutting tool 306 and a tool body 308, wherein the tool body is configured to engage one of the slots 220 in the carousel 218. In some embodiments the cutting tool may be integral with the tool body. However, in other embodiments the cutting tool 306 may be detachable from the tool body 308.

Figure 8:
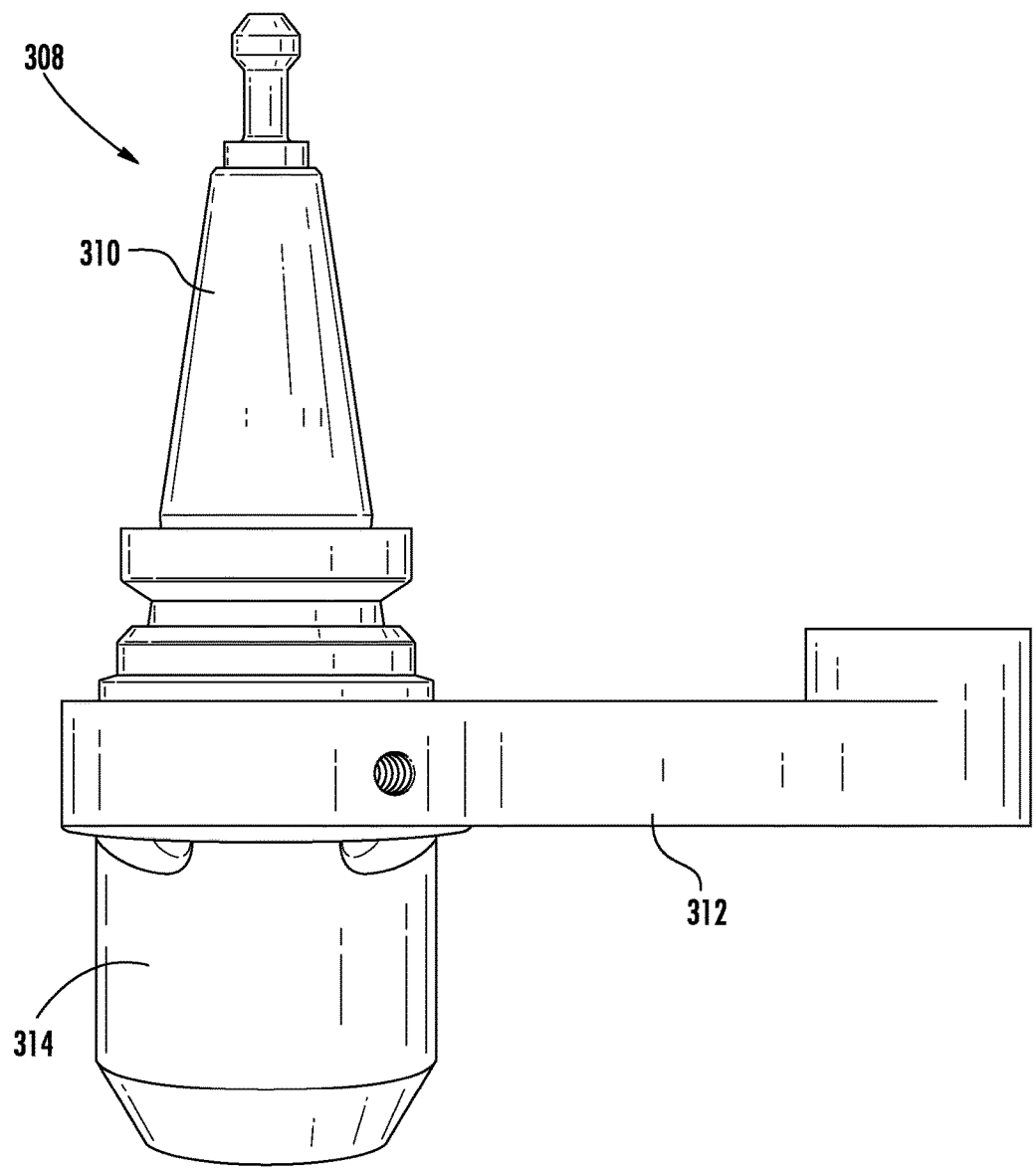
FIG. 8 illustrates a side view of the tool body of FIG. 7 according to an example embodiment of the present disclosure.
Figure 9:
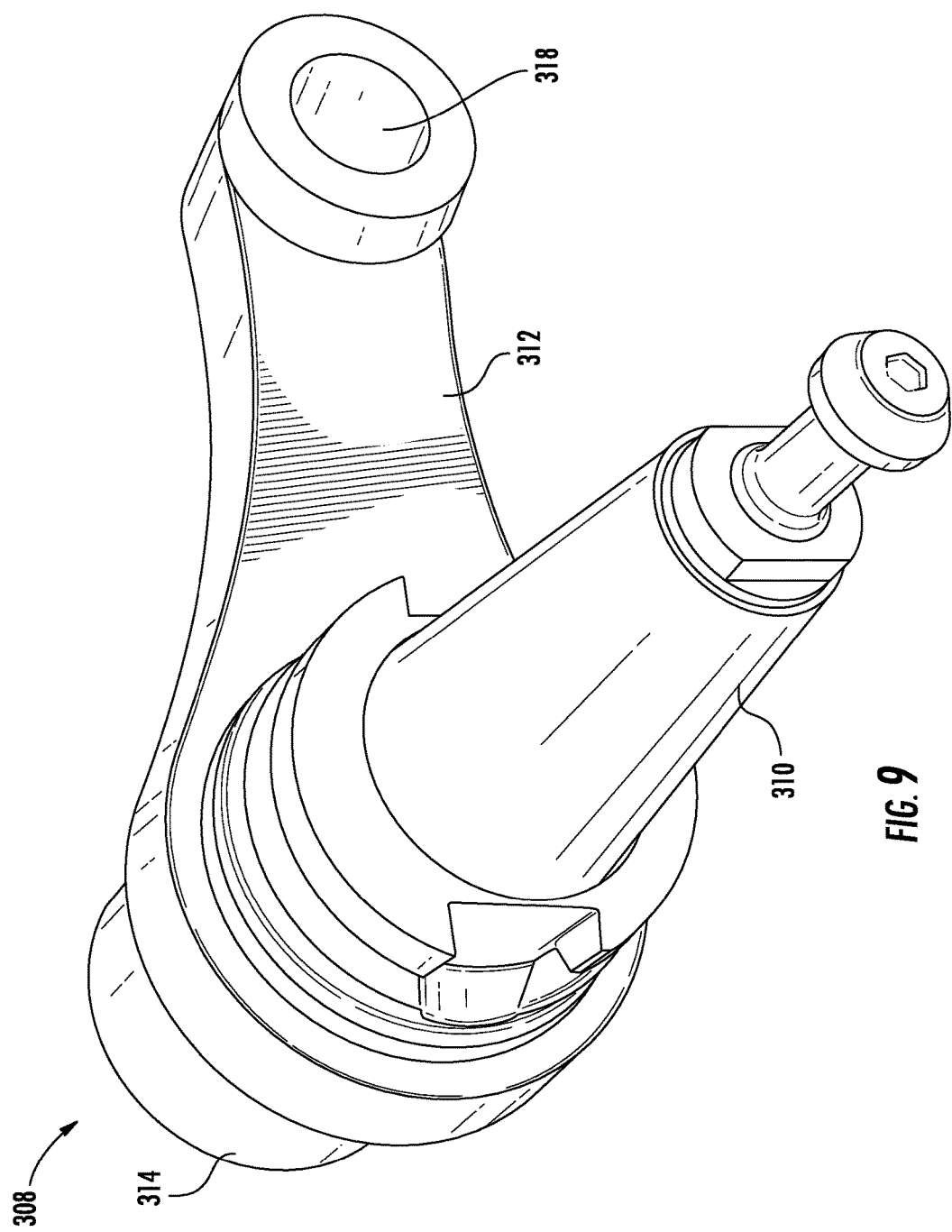
FIG. 9 illustrates a perspective view of the tool body of FIG. 7 according to an example embodiment of the present disclosure.

In this regard, FIGS. 8 and 9 illustrate the tool body 308 separated from the cutting tool 306. As illustrated, the tool body 308 may comprise a machine connector 310 configured to engage the rotary head 206 of the CNC mill 200. In this regard, the machine connector 310 may include any feature associated with a typical tool connector configured to engage the rotary head 206. The tool body 308 may further comprise an arm 312. The arm 312 may be configured to extend substantially perpendicularly to a rotational axis of the rotary head 206. In this regard, as illustrated, the arm 312 may extend substantially perpendicularly to the machine connector 310. As used herein, substantially perpendicular extension of the arm 312 refers to a configuration in which the end of the arm is displaced from the rotational axis of the tool body 308 and the rotary head 206 to which the tool body is configured to connect. Thus, the arm 312 need not extend at a right angle with respect to the machine connector 310 in all embodiments.

Additionally, the tool body 308 may comprise an end effector connector 314. The end effector connector 314 may be configured to engage the cutting tool 306. In this regard, for example, the end effector connector 314 may comprise a so-called "chuck," or any other embodiment of connector configured to engage a tool.

Figure 10:
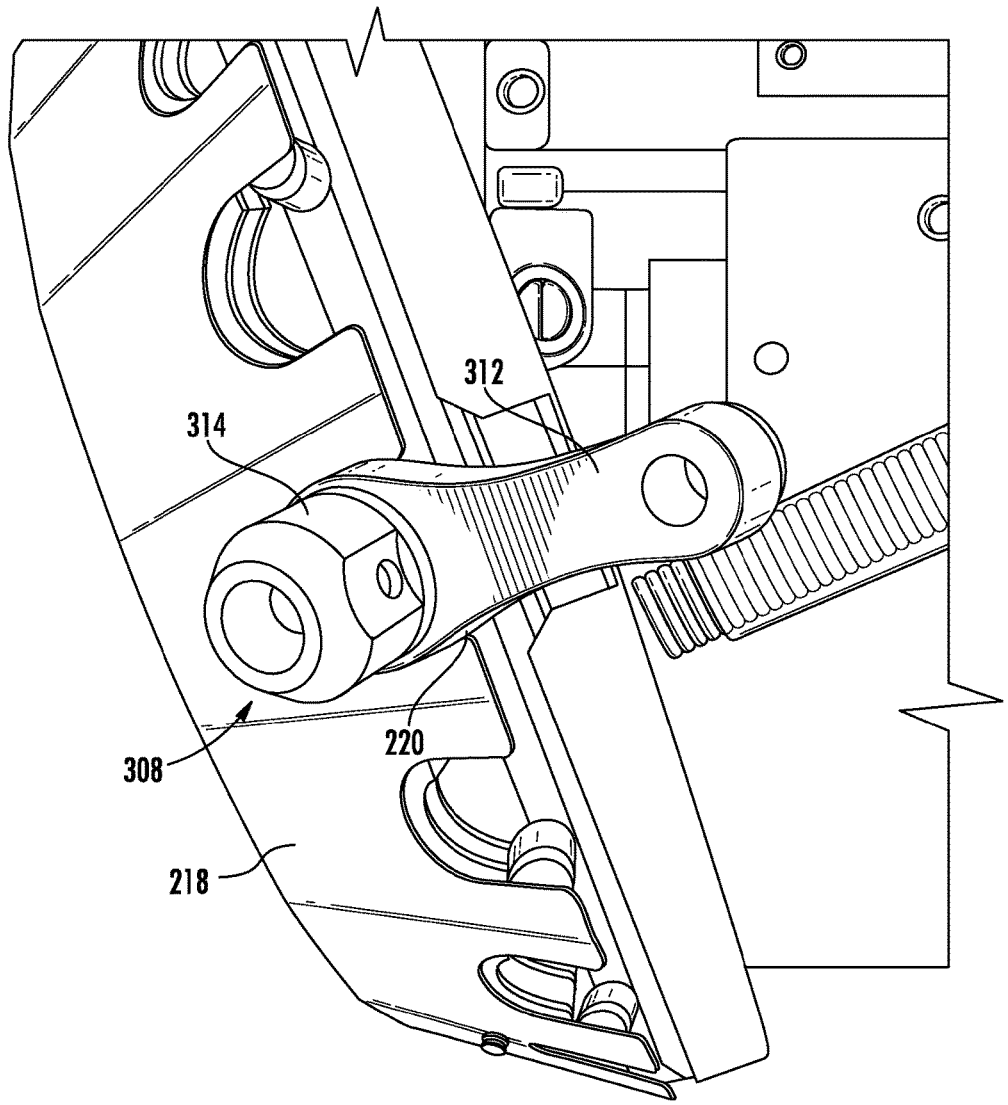
FIG. 10 illustrates a side view of a carousel of the material removal system of FIG. 7 with the tool body received in a slot therein according to an example embodiment of the present disclosure.

FIG. 10 illustrates the tool body 308 engaged with one of the slots 220 in the carousel 218. As illustrated, in some embodiments the tool body 308 may be stored in the slot 220 separately from the cutting tool 306. However, in another embodiment the cutting tool 306 may be coupled to the tool body 308 when the tool body is received in the slot 220 in the carousel 218 (see, e.g., FIG. 7). Thereby, when the carousel 218 is rotated and the tool body 308 is transferred from the carousel to the rotary head 206, the non-rotary tool 304 may be ready for use.

Figure 11:
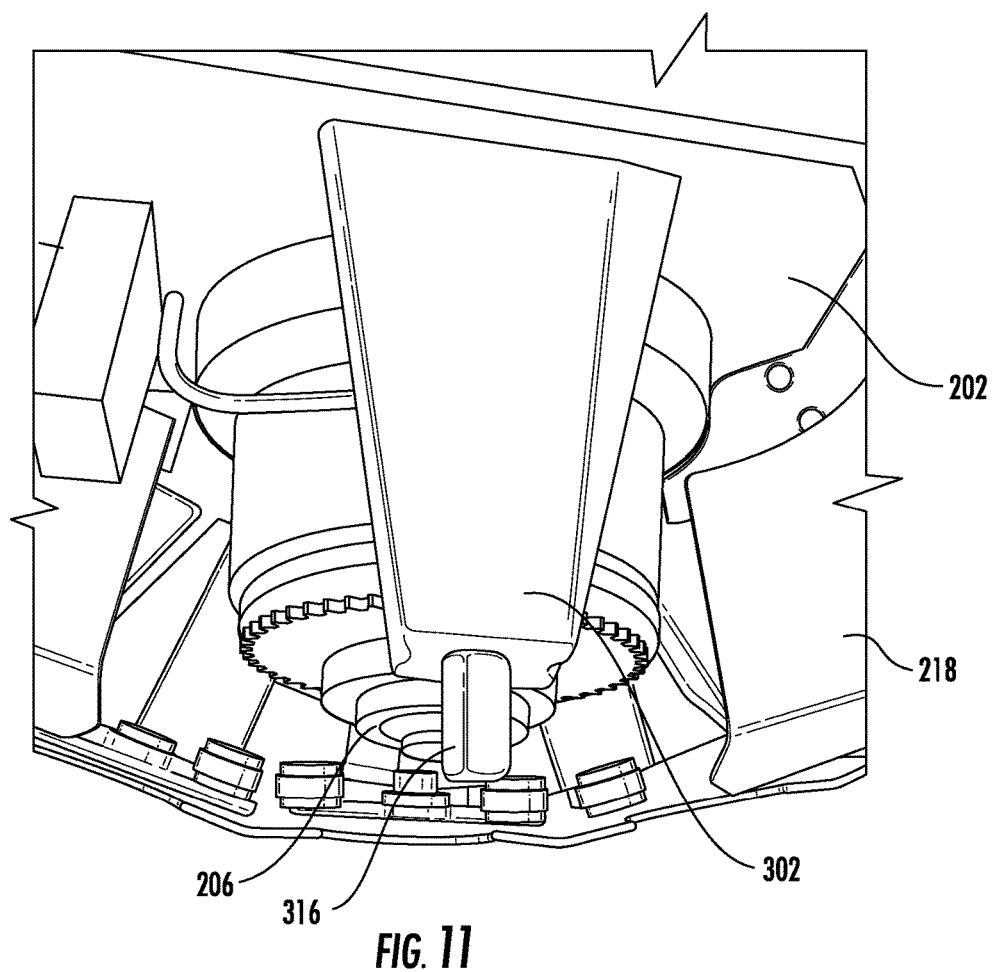
FIG. 11 illustrates a perspective view of a rotation restraint member of the material removal system of FIG. 7 according to an example embodiment of the present disclosure.

FIG. 11 illustrates the rotation restraint member 302. As illustrated, the rotation restraint member 302 may be coupled to the body 202 of the CNC mill. For example, the rotation restraint member 302 may be coupled thereto via one or more bolts extending through existing bolt holes. Accordingly, the CNC mill may be relatively easily retrofitted to include the rotation restraint member 302. However, the rotation restraint member 302 may be coupled in any manner to a portion of the CNC mill that is positioned at a fixed distance from the rotational axis of the rotary head 206.

Figure 12:
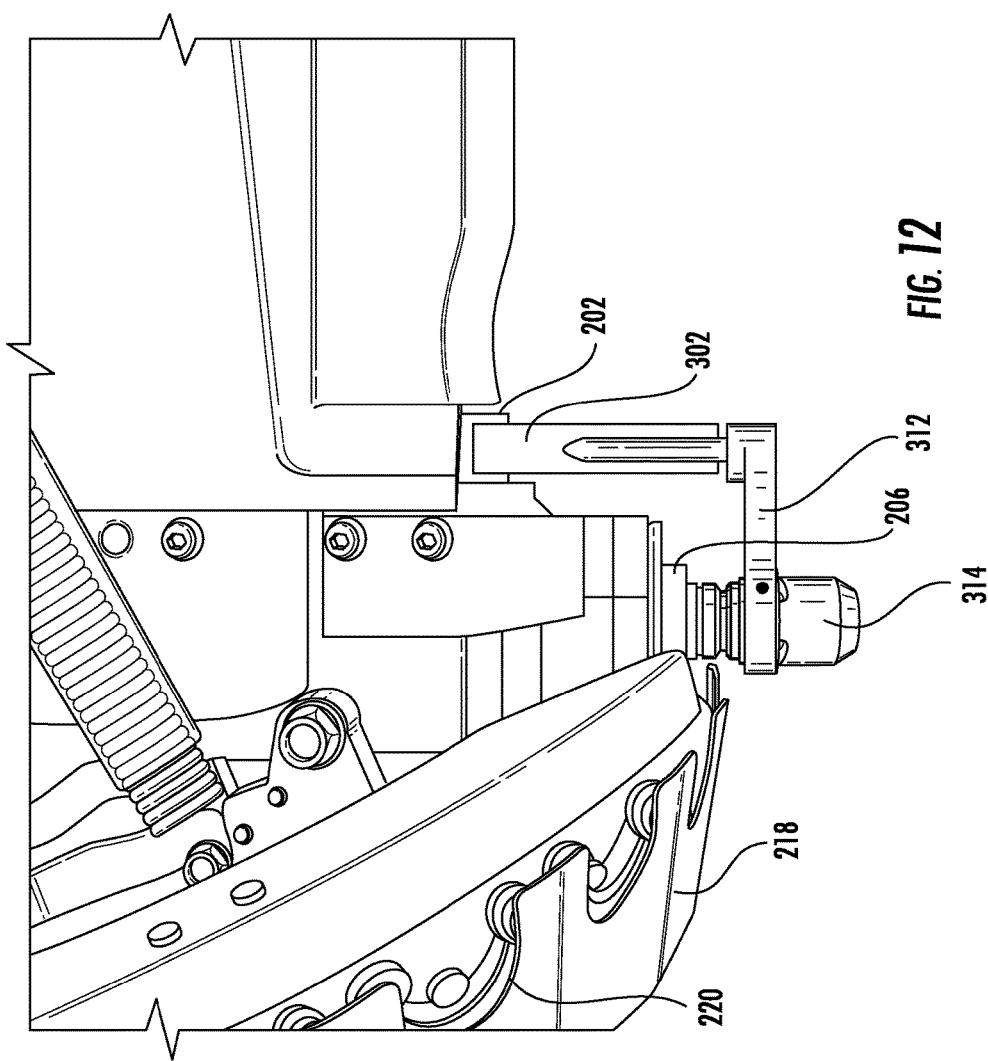
FIG. 12 illustrates a partial side view of the material removal system with the tool body engaged with the rotation restraint member according to an example embodiment of the present disclosure.

The rotation restraint member 302 may comprise a protrusion 316 (see, e.g., FIG. 11). Further, the arm 312 of the tool body 308 may comprise an aperture 318 (see, e.g., FIG. 9). Note that in another embodiment the rotation restraint member may comprise the aperture and the arm may comprise the protrusion. Regardless, as illustrated in FIG. 12, the arm 312 of the tool body 308 may engage the rotation restraint member 302 when the machine connector 310 is coupled to the rotary head 206 of the CNC mill. For example, the arm 312 may engage the rotation restraint member 302 when the cutting tool 210 is removed from the rotary head 206 (e.g., received in one of the slots 220 in the carousel 218) and the tool body 308 is transferred from one of the slots in the carousel to the rotary head 206. Further, as described above, the rotation restraint member 302 may be coupled to the body 202 of the CNC mill or other component or structure such that the rotation restraint member is positioned at a fixed location. Accordingly, the rotation restraint member 302 may restrain rotary motion of the tool body 308 when the tool body is coupled to the rotary head 206 and engaged with the rotation restraint member.

Figure 13:
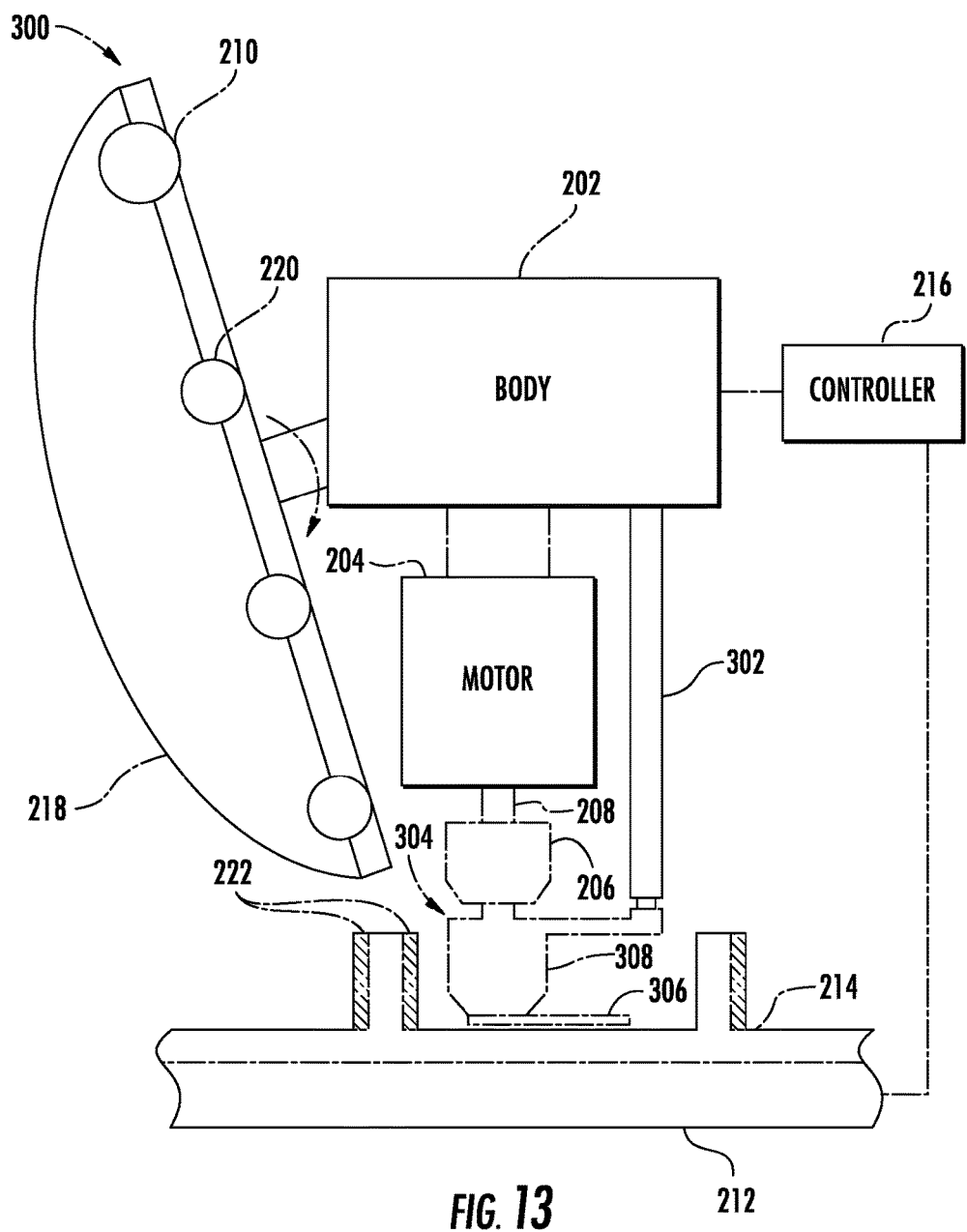
FIG. 13 schematically illustrates a side view of the material removal system with the tool body engaged with the rotation restraint member according to an example embodiment of the present disclosure.

Further, the cutting tool 306 may couple to the end effector connector 314 such that the cutting tool is rotationally fixed with respect to the tool body 308. Thereby, as illustrated in FIG. 13, the cutting tool 306 may be rotationally restrained and the system 300 may be ready for use in removing material from the substrate 214. Accordingly, the cutting tool 306 may be moved (e.g., translated) with respect to the substrate 214 such that the cutting tool contacts the substrate and removes material therefrom. In this regard, the cutting tool 306 may be configured to scrape against the substrate 214 to remove material therefrom. For example, the cutting tool 306 may remove the remaining material sections 222 by scraping thereagainst. In one embodiment the machining table 212 may move the substrate 214 relative to the cutting tool 306 to remove the material. However, in an alternative embodiment the substrate 214 may be stationary and the CNC mill may move the non-rotary tool 304 with respect thereto, or both the non-rotary tool and the substrate 214 may move.

Figure 14:
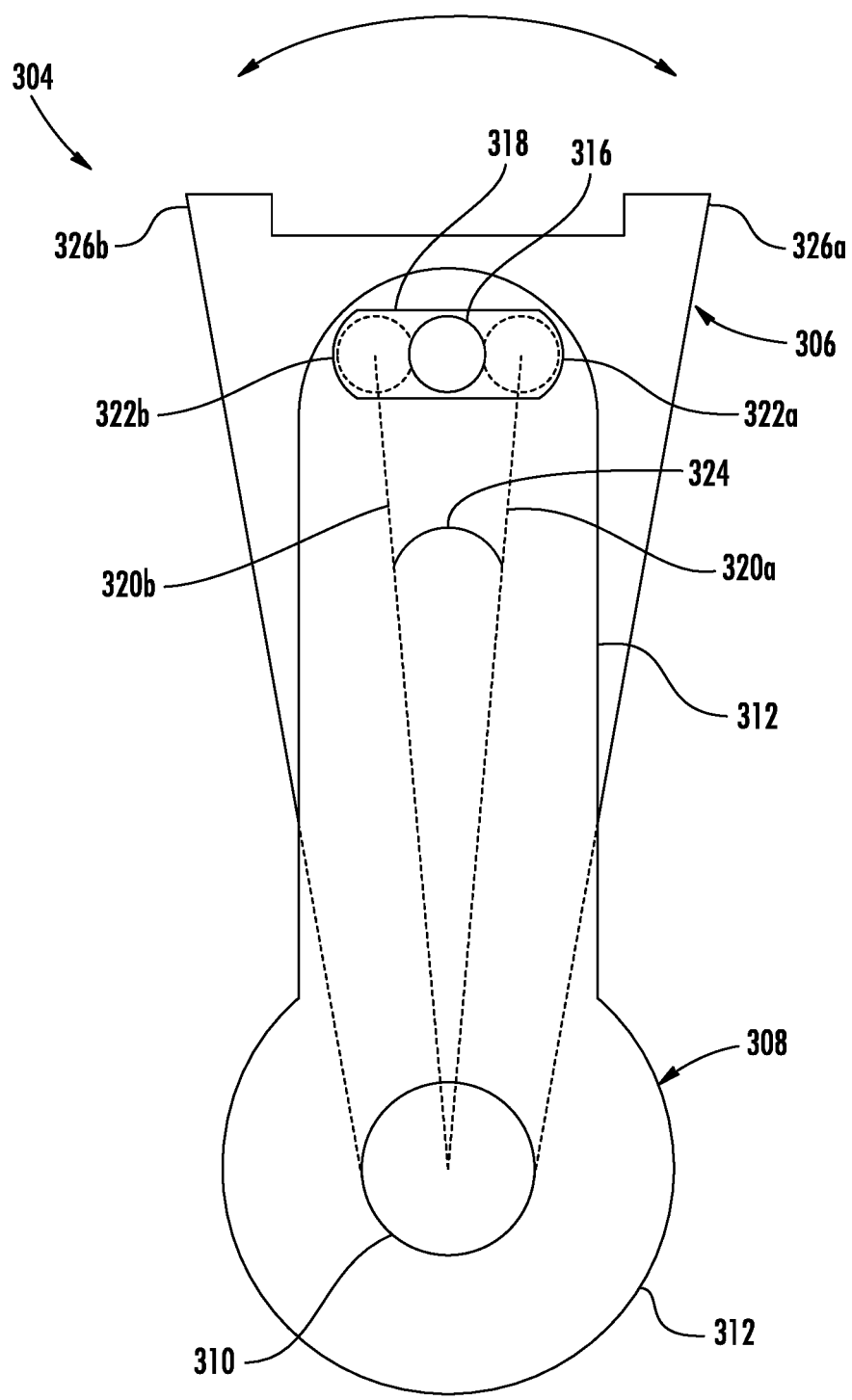
FIG. 14 illustrates a top view of the non-rotary tool of FIG. 7 according to an example embodiment of the present disclosure.

In some embodiments the non-rotary tool 304 may include certain features configured to facilitate removal of material from a substrate. In this regard, FIG. 14 illustrates a top view of the non-rotary tool 304. As illustrated, in one embodiment the aperture 318 in the arm 312 may be elongated. More particularly, the aperture 318 in the arm 312 may be elongated relative to the dimensions of the protrusion 316 of the rotation restraint member 302. Accordingly, as illustrated, the tool body 308 and the cutting tool 306 may rotate slightly between first and second angular limits 320a, 320b defined by contact between first and second ends 322a, 322b of the aperture 318 and the protrusion 316 of the stationary member. Accordingly, the non-rotary tool 304 may be configured to pivot within a limited angular range 324 about the rotational axis of the rotary head 206. Note, as described above, in an alternative embodiment the aperture may be defined in the rotation restraint member and the arm of the tool body may define the protrusion. In this embodiment, movement of the non-rotary tool within the limited angular range may be accomplished in a similar manner by employing an elongated aperture in the rotation restraint member.

Figure 15:
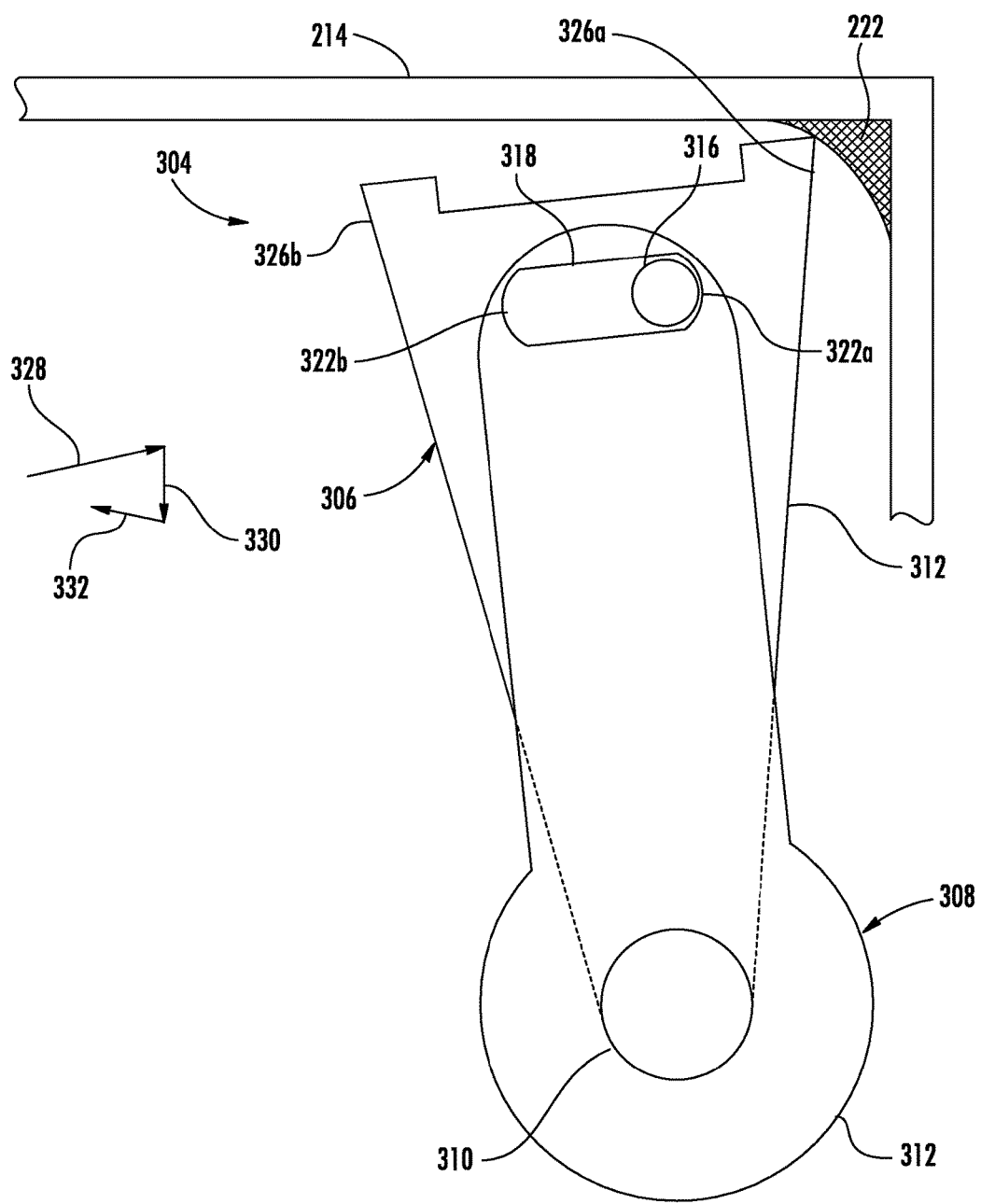
FIG. 15 illustrates a top view of the non-rotary tool of FIG. 7 moving in a first direction according to an example embodiment of the present disclosure.
Figure 16:
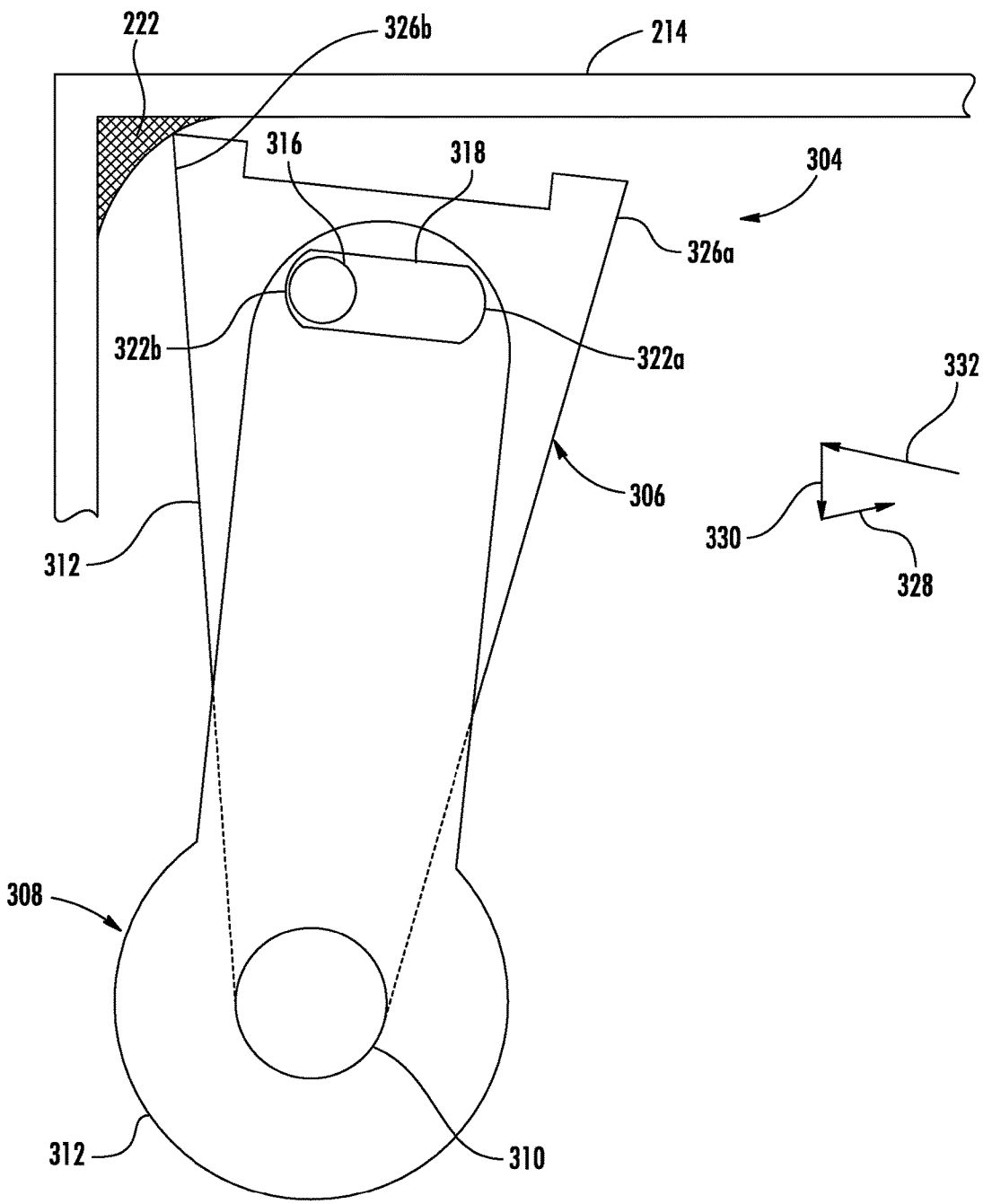
FIG. 16 illustrates a top view of the non-rotary tool of FIG. 7 moving in a second direction according to an example embodiment of the present disclosure.

As further illustrated in FIG. 14, in some embodiments the cutting tool 306 may include first and second cutting edges 326a, 326b. FIG. 15 illustrates cutting the substrate 214 with the first cutting edge 326a. Conversely, FIG. 16 illustrates cutting the substrate with the second cutting edge 326b.

More particularly, FIG. 15 illustrates movement of the non-rotary tool 304 relative to the substrate 214 in a first direction 328, whereby the cutting tool 306 may remove one of the remaining material sections 222. As illustrated, contact between the substrate 214 and a first cutting edge 326a of the cutting tool 306 may cause the non-rotary tool 304 to pivot such that the first end 322a of the aperture 318 comes into contact with the protrusion 316 of the rotation restraint member 302. Further, as a result of engagement of the first cutting edge 326a of the cutting tool 306 with the substrate 214 and the above-described pivoting movement, the second cutting edge 326b of the cutting tool may retract from the substrate. Accordingly, a clearance between the second cutting edge 326b of the cutting tool 306 may allow for removal of chips, chunks, or other removed pieces of the material defining the substrate 214. In this regard, without the pivoting movement, material removed from the substrate 214 may become lodged in the cutting tool 306 or otherwise detrimentally affect the cutting operation.

Further, in order to facilitate additional removal of chips cut from the substrate 214, after the cutting tool 306 cuts the substrate to a desired extent (e.g., when the first cutting edge 326a reaches the end of the remaining material section 222, the non-rotary tool 304 may be retracted from the substrate in an outward direction 330. Thereafter, the non-rotary cutting tool 304 may be moved (e.g., translated) with respect to the substrate in a second direction 332 that at least partially opposes the first direction 326.

Thus, the non-rotary tool 304 may pivot during transition from movement in the first direction 328 to movement in the second direction 332. The pivoting may be passive in that pivoting of the non-rotary tool 304 is caused by contact with the substrate 214. In this regard, FIG. 16 illustrates movement of the non-rotary tool 304 in the second direction 332 after the contact between the substrate 214 and the second cutting edge 326b of the cutting tool 306 causes the non-rotary tool 304 to pivot such that the second end 322b of the aperture 318 comes into contact with the protrusion 316 of the rotation restraint member 302. Further, as a result of engagement of the second cutting edge 326b of the cutting tool 306 with the substrate 214 and the above-described pivoting movement, the first cutting edge 326a of the cutting tool may retract from the substrate. Accordingly, a clearance between the first cutting edge 326a of the cutting tool 306 may allow for removal of chips, chunks, or other removed pieces of the material defining the substrate 214. In this regard, without the pivoting movement, material removed from the substrate 214 may become lodged in the cutting tool 306 or otherwise detrimentally affect the cutting operation. Thereafter, the non-rotary tool 304 may be retracted from the substrate in the outward direction 330 and the non-rotary tool may once again be directed in the first direction 328. Accordingly, repetitive movement of the cutting tool 306 in this manner may allow for removal of material from the substrate 214 (e.g., the remaining material sections 222), which may otherwise be difficult to remove, as described above. Note that, as a result of the pivoting movement of the non-rotary tool 304, the total lateral movement of the tool body 308 relative to the substrate 214 may exceed the dimensions cut by the cutting tool 306.

Figure 17:
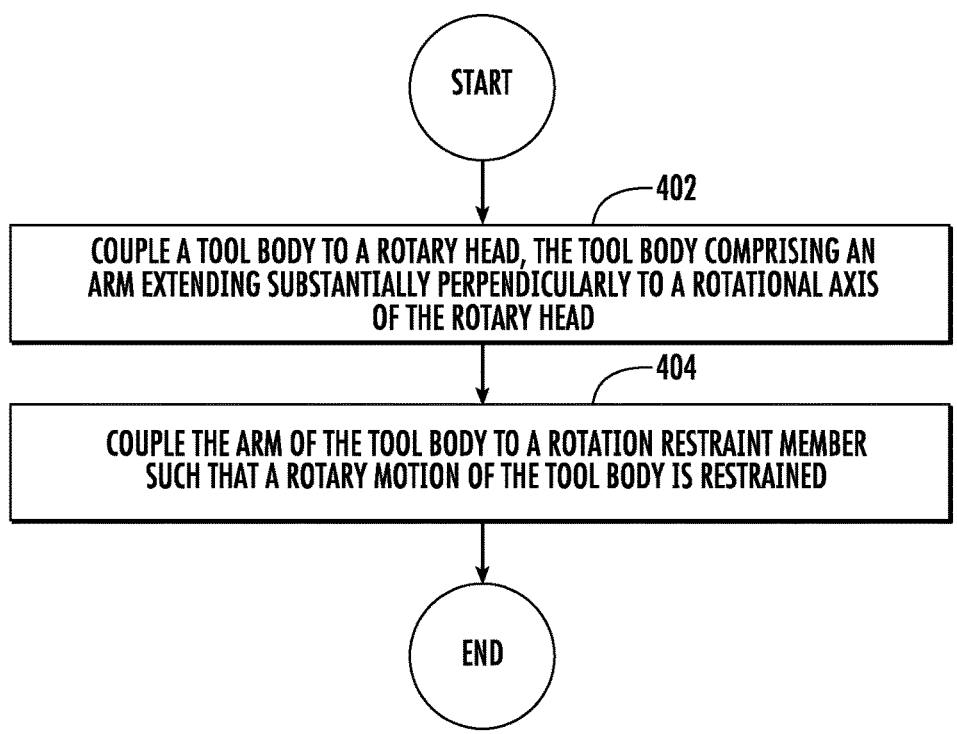
FIG. 17 schematically illustrates a method for converting a rotary machine to non-rotary machine according to an example embodiment of the present disclosure.

A related method for converting a rotary machine to non-rotary machine is also provided. As illustrated in FIG. 17, the method may include coupling a tool body to a rotary head, the tool body comprising an arm extending substantially perpendicularly to a rotational axis of the rotary head at operation 402. Further, the method may include coupling the arm of the tool body to a rotation restraint member such that a rotary motion of the tool body is restrained at operation 404.

In some embodiments of the method, coupling the tool body to the rotary head at operation 402 may comprise inserting a machine connector of the tool body into the rotary head. Further, coupling the arm of the tool body to the rotation restraint member at operation 404 may comprise inserting a protrusion of the rotation restraint member into an aperture defined in the arm. Additionally, the method may include coupling a cutting tool to an end effector connector of the tool body. The method may further comprise decoupling a rotary tool from the rotary head prior to coupling the tool body to the rotary head at operation 402.

Figure 18:
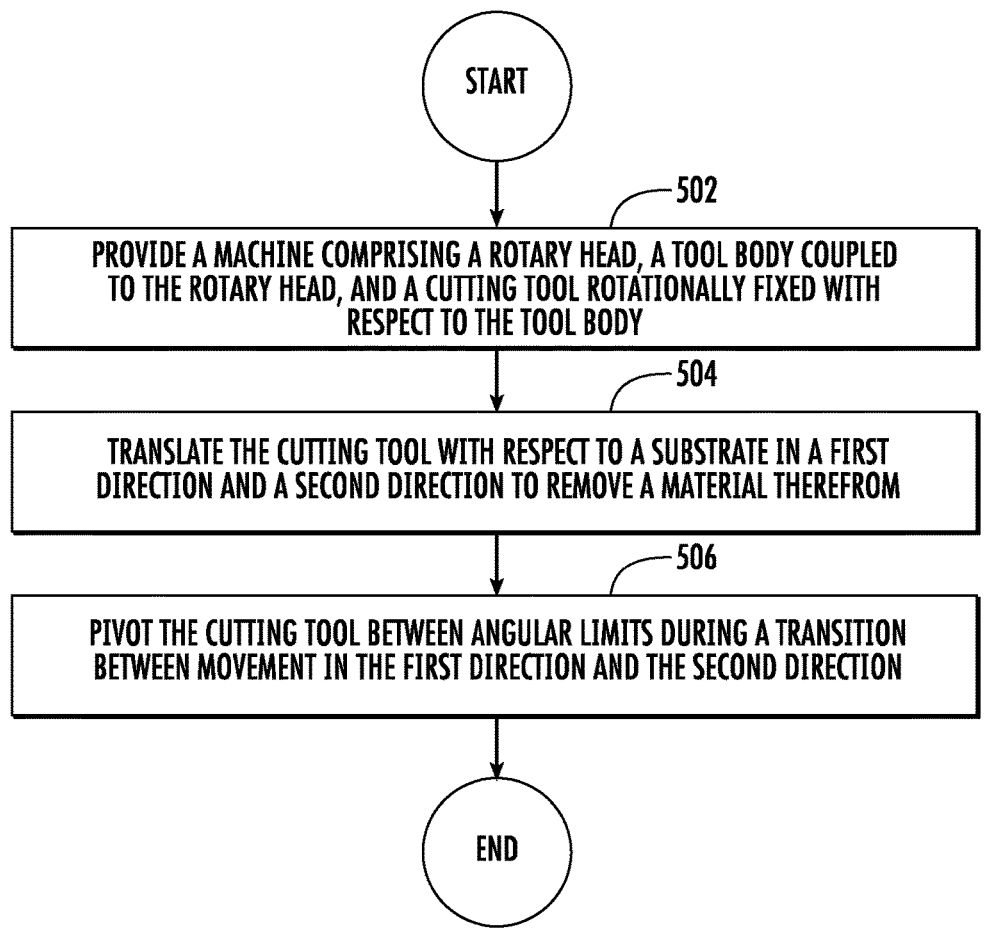
FIG. 18 schematically illustrates a manufacturing method according to an example embodiment of the present disclosure.

A manufacturing method is also provided. As illustrated in FIG. 18, the method may include providing a machine comprising a rotary head configured to rotate about a rotational axis, a tool body coupled to the rotary head via a machine connector, and a cutting tool rotationally fixed with respect to the tool body, the tool body comprising an arm coupled to a rotation restraint member such that a rotary motion of the tool body about the rotational axis is restrained within first and second angular limits at operation 502. Further, the method may include translating the cutting tool with respect to a substrate in a first direction and a second direction to remove a material therefrom at operation 504. The method may additionally include pivoting the cutting tool between the angular limits during a transition between movement in the first direction and the second direction at operation 506.

In some embodiments translating the cutting tool with respect to the substrate in the first direction at operation at operation 504 may comprise engaging a first cutting edge of the cutting tool with the substrate and retracting a second cutting edge of the cutting tool from the substrate. Further, translating the cutting tool with respect to the substrate in the second direction may comprise engaging the second cutting edge of the cutting tool with the substrate and retracting the first cutting edge of the cutting tool from the substrate. Additionally, pivoting the cutting tool at operation 506 may comprise passively pivoting the cutting tool. Further, pivoting the cutting tool between the angular limits at operation 506 may comprise disengaging the rotation restraint member from a first end of an aperture defined in the arm and engaging the rotation restraint member with a second end of the aperture defined in the arm.

Figure 19:
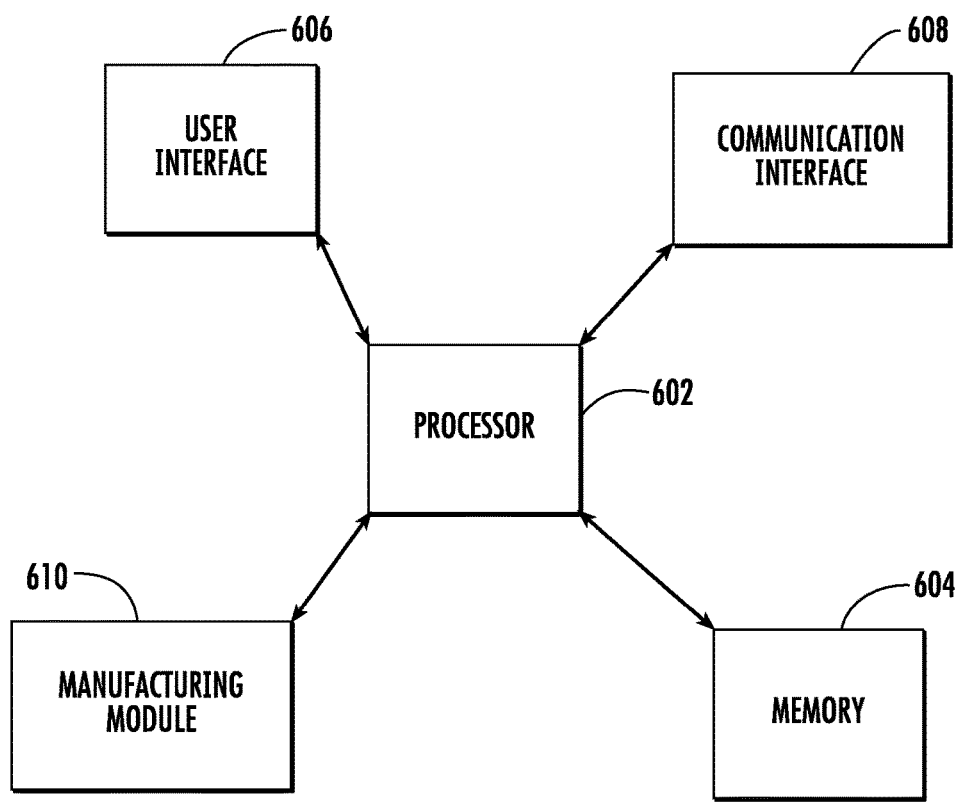
FIG. 19 schematically illustrates a block diagram of an electronic device according to an example embodiment of the present disclosure.

FIG. 19 is a block diagram of an electronic device 600 suitable for use with the described embodiments. In one example embodiment the electronic device 600 may be embodied in or as a controller configured for controlling manufacturing operations as disclosed herein. In this regard, the electronic device 600 may be configured to control or execute the above-described manufacturing operations performed by the CNC mill 200 of the system 300. In this regard, the electronic device 600 may be embodied in or as the controller 216.

The electronic device 600 illustrates circuitry of a representative computing device. The electronic device 600 may include a processor 602 that may be microprocessor or controller for controlling the overall operation of the electronic device 600. In one embodiment the processor 602 may be particularly configured to perform the functions described herein relating to manufacturing. The electronic device 600 may also include a memory device 604. The memory device 604 may include non-transitory and tangible memory that may be, for example, volatile and/or non-volatile memory. The memory device 604 may be configured to store information, data, files, applications, instructions or the like. For example, the memory device 604 could be configured to buffer input data for processing by the processor 602. Additionally or alternatively, the memory device 604 may be configured to store instructions for execution by the processor 602.

The electronic device 600 may also include a user interface 606 that allows a user of the electronic device 600 to interact with the electronic device. For example, the user interface 606 can take a variety of forms, such as a button, keypad, dial, touch screen, audio input interface, visual/image capture input interface, input in the form of sensor data, etc. Still further, the user interface 606 may be configured to output information to the user through a display, speaker, or other output device. A communication interface 608 may provide for transmitting and receiving data through, for example, a wired or wireless network such as a local area network (LAN), a metropolitan area network (MAN), and/or a wide area network (WAN), for example, the Internet.

The electronic device 600 may also include a manufacturing module 610. The processor 602 may be embodied as, include or otherwise control the manufacturing module 610. The manufacturing module 610 may be configured for controlling or executing the manufacturing operations as discussed herein.

In this regard, for example, in one embodiment a computer program product comprising at least one computer-readable storage medium having computer-executable program code portions stored therein is provided. The computer-executable program code portions, which may be stored in the memory device 604, may include program code instructions for performing the manufacturing operations disclosed herein.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A tool configured to be coupled to a rotary machine and to remove material from a substrate, the rotary machine including a rotary head and a rotation restraint member, the tool comprising:
    a tool body, comprising:
        a machine connector configured to engage the rotary head, and
        an arm configured to extend substantially perpendicularly to a rotational axis of the rotary head, the arm including an elongated aperture arranged to accept a protrusion of the rotation restraint member, wherein during a cutting operation, the arm pivots about the rotational axis according to (i) a first angular limit that corresponds to a position where the protrusion contacts a first end of the elongated aperture, and (ii) a second angular limit that corresponds to a position where the protrusion contacts a second end of the elongated aperture that is opposite to the first end; and
    a cutting tool that is arranged to (i) pivot along with the arm about the rotational axis, and (ii) be detachably connected to the tool body.

2. The tool of claim 1, wherein the cutting tool includes first and second cutting edges.

3. The tool of claim 2, wherein when the first cutting edge is cutting the substrate, the second cutting edge is retracted from the substrate.

4. The tool of claim 1, wherein the tool body further comprises an end effector connector that is detachably connected to the cutting tool.

5. The tool of claim 1, wherein a pivot motion of the arm is initiated by contact between the cutting tool and the substrate.

6. A method of removing material from a substrate using a rotary machine having a rotary head and a rotation restraint member, the method comprising:
    coupling a machine connector of a tool body to the rotary head, the tool body including an arm extending substantially perpendicularly to a rotational axis of the rotary head, wherein the arm includes (i) an elongated aperture, and (ii) a cutting tool detachably coupled to the tool body that is arranged to pivot along with the arm about the rotational axis;

coupling the arm of the tool body to the rotation restraint member such that a protrusion of the rotation restraint member is positioned between a first end of the elongated aperture and an opposing second end of the elongated aperture; and removing the material from the substrate by pivoting the cutting tool along with the arm about the rotational axis during a material removal operation, wherein during the material removal operation, the arm pivots about the rotational axis according to (i) a first angular limit that corresponds to a position where the protrusion contacts the first end of the elongated aperture, and (ii) a second angular limit that corresponds to a position where the protrusion contacts the second end of the elongated aperture.

7. The method of claim 6, wherein a longitudinal axis of the arm extends substantially perpendicular to a longitudinal axis of the machine connector.

8. The method of claim 6, further comprising:
coupling the cutting tool to an end effector connector of the tool body.

9. The method of claim 6, further comprising:
decoupling a rotary tool from the rotary head prior to coupling the machine connector of the tool body to the rotary head.

10. A method of removing material from a substrate by using a rotary machine having a rotary head and a rotation restraint member, the method comprising:
coupling a tool body to the rotary head via a machine connector of the tool body, the machine connector configured to engage the rotary head, wherein the tool body includes an arm extending substantially perpendicular to a rotational axis of the rotary head, and the arm includes an elongated aperture and a cutting tool detachably coupled to the tool body, wherein the cutting tool is arranged to pivot along with the arm about the rotational axis and is detachably connected to the tool body;

coupling the arm to the rotation restraint member such that a protrusion of the rotation restraint member is positioned between a first end of the elongated aperture and an opposing second end of the elongated aperture; and translating the cutting tool with respect to the substrate to remove the material from the substrate during a material removal operation, wherein during the material removal operation, the arm pivots about the rotational axis according to (i) a first angular limit that corresponds to a position where the protrusion contacts the first end of the elongated aperture, and (ii) a second angular limit that corresponds to a position where the protrusion contacts the second end of the elongated aperture.

11. The method of claim 10, wherein translating the cutting tool with respect to the substrate comprises engaging a first cutting edge of the cutting tool with the substrate and retracting a second cutting edge of the cutting tool from the substrate.

12. The method of claim 11, wherein translating the cutting tool with respect to the substrate comprises engaging the second cutting edge of the cutting tool with the substrate and retracting the first cutting edge of the cutting tool from the substrate.

13. The method of claim 10, wherein the pivot motion of the arm provides clearance for chips of material to be removed from the substrate.

14. The method of claim 10, further comprising coupling the cutting tool with an end effector of the tool body.

15. A tool configured to be coupled to a rotary machine for removing material from a substrate, the rotary machine including a rotary head and a rotation restraint member, the tool comprising:
a tool body including (i) a machine connector configured to engage the rotary head, and (ii) an arm extending substantially perpendicular to a rotational axis of the rotary head, wherein the arm includes an elongated aperture capable of receiving a protrusion of the rotation restraint member; and a cutting tool detachably connected to the tool body and the cutting tool is capable of rotating along with the arm during a material removal operation, wherein during the material removal operation, the arm is capable of pivoting with respect to the rotary head in a direction perpendicular to the rotational axis, and the cutting tool includes (i) a first cutting edge, and (ii) a second cutting edge opposite the first cutting edge, and during the material removal operation, the arm pivots about the rotational axis such that the first cutting edge is arranged to remove the material from the substrate in accordance with the arm pivoting according to a first angular limit that corresponds to a position where the protrusion contacts a first end of the elongated aperture, and the second cutting edge is arranged to remove the material from the substrate in accordance with the arm pivoting according to a second angular limit that corresponds to a position where the protrusion contacts a second end of the elongated aperture that is opposite to the first end.

16. The tool of claim 15, wherein the first and second cutting edges are laterally displaced from the rotational axis.

17. The tool of claim 15, wherein the rotation restraint member is parallel to the rotational axis.

18. The tool of claim 15, wherein the cutting tool is characterized as having a triangular shape and the first and second cutting edges correspond to sides of the triangular shape.

19. The tool of claim 15, wherein a rotational motion of the cutting tool is initiated by contact between the cutting tool and the substrate.

20. The tool of claim 15, wherein during the material removal operation, when the arm pivots according to the first angular limit, the second cutting edge is arranged to retract from the substrate.

* * * * *